(12) United States Patent
Jiang et al.

(10) Patent No.: US 9,673,948 B2
(45) Date of Patent: Jun. 6, 2017

(54) HYBRID PILOT DESIGN FOR LOW LATENCY COMMUNICATION

(71) Applicant: QUALCOMM Incorporated, San Diego, CA (US)

(72) Inventors: Jing Jiang, San Diego, CA (US); Joseph Binamira Soriaga, San Diego, CA (US); Tingfang Ji, San Diego, CA (US); John Edward Smee, San Diego, CA (US); Peter Gaal, San Diego, CA (US); Krishna Kiran Mukkavilli, San Diego, CA (US); Naga Bhushan, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 14/706,193

(22) Filed: May 7, 2015

(65) Prior Publication Data
US 2016/0127093 A1 May 5, 2016

Related U.S. Application Data

(60) Provisional application No. 62/072,329, filed on Oct. 29, 2014.

(51) Int. Cl.
*H04L 5/00* (2006.01)
*H04W 72/06* (2009.01)

(52) U.S. Cl.
CPC .......... *H04L 5/0048* (2013.01); *H04L 5/0007* (2013.01); *H04L 5/0051* (2013.01); *H04L 5/0064* (2013.01); *H04W 72/06* (2013.01)

(58) Field of Classification Search
None
See application file for complete search history.

(56) References Cited

U.S. PATENT DOCUMENTS

| 5,920,551 | A | 7/1999 | Na et al. |
| 7,289,473 | B1 | 10/2007 | Padovani et al. |
| 8,098,767 | B2 | 1/2012 | Mirbagheri et al. |
| 8,102,832 | B2 | 1/2012 | Agrawal et al. |

(Continued)

OTHER PUBLICATIONS

ISA/EPO, International Search Report and Written Opinion of the International Searching Authority, Int'l. App. No. PCT/US2015/054211, Feb. 1, 2016, European Patent Office, Rijswijk, NL, 11 pgs.

*Primary Examiner* — Diane Lo
(74) *Attorney, Agent, or Firm* — Holland & Hart

(57) ABSTRACT

Methods, systems, and devices are described for wireless communication at a UE. A base station may select a hybrid pilot configuration including a relatively sparse periodic pilot and a dense pilot embedded in one or more symbols of a low latency burst. A user equipment (UE) may generate a long term statistical average channel estimate based on the periodic pilot and an instantaneous channel estimate (e.g., for demodulation) based on the dense pilot embedded in the low latency burst. The UE may refine the instantaneous channel estimate by converting a control channel embedded with the burst. In some instances, the base station may embed the dense pilots in the first symbol of a burst and transmit subsequent low latency symbols with a reduced density pilot (or without pilot tones).

26 Claims, 19 Drawing Sheets

(56) References Cited

U.S. PATENT DOCUMENTS

| | | |
|---|---|---|
| 8,238,931 B1 | 8/2012 | Sarkar et al. |
| 2010/0246515 A1* | 9/2010 | Tsai ........................ H04L 5/005 370/329 |
| 2011/0235567 A1* | 9/2011 | Seo ...................... H04B 7/0617 370/312 |
| 2014/0079148 A1 | 3/2014 | Nammi |
| 2014/0153669 A1 | 6/2014 | Imamura et al. |

* cited by examiner

HYBRID PILOT DESIGN FOR LOW LATENCY COMMUNICATION

CROSS REFERENCES

The present application for patent claims priority to U.S. Provisional Patent Application No. 62/072,329 by Jiang et al., entitled "Hybrid Pilot Design for Low Latency Communication," filed Oct. 29, 2014, and assigned to the assignee hereof.

BACKGROUND

Field of Disclosure

The following relates generally to wireless communication, and more specifically to hybrid pilot design for low latency communication.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some wireless systems, traffic may include a low latency frame structure which may be sensitive to instantaneous fluctuations in channel quality (e.g., from interference or noise). In such cases, widely spaced periodic pilots may not sufficiently characterize a channel (e.g., they may not be suitable for instantaneous channel estimation for demodulation). However, densely spaced periodic pilots may result in significant overhead.

SUMMARY

The present disclosure may relate generally to wireless communications systems, and more particularly to improved systems, methods, or apparatuses for hybrid pilot design for low latency communication. A base station may select a hybrid pilot configuration including a relatively sparse periodic pilot and a dense pilot embedded in one or more symbols of a low latency burst. A user equipment (UE) may generate a long term statistical average channel estimate (or long term statistics of the channel, such as channel power delay profile (PDP), center of mass, interference pattern, etc.) based on the periodic pilot and an instantaneous channel estimate (e.g., for demodulation) based on the dense pilot embedded in the low latency burst. The UE may refine the instantaneous channel estimate (i.e., perform time domain channel clean-up or windowing based on long term channel PDP) by converting a control channel embedded with the burst. In some instances, the base station may embed the dense pilots in the first symbol of a burst and transmit subsequent low latency symbols with a reduced density pilot (or without pilot tones).

A method of wireless communication at a UE is described. The method may include receiving a first set of pilot signals based at least in part on a periodic pilot transmission configuration, and receiving a low latency burst comprising an embedded second set of pilot signals based at least in part on a burst pilot transmission configuration, wherein the burst pilot transmission configuration is different than the periodic pilot transmission configuration.

An apparatus for wireless communication at a UE is described. The apparatus may include means for receiving a first set of pilot signals based at least in part on a periodic pilot transmission configuration, and means for receiving a low latency burst comprising an embedded second set of pilot signals based at least in part on a burst pilot transmission configuration, wherein the burst pilot transmission configuration is different than the periodic pilot transmission configuration.

A further apparatus for wireless communication at a UE is described. The apparatus may include a processor, memory in electronic communication with the processor, and instructions stored in the memory, wherein the instructions are executable by the processor to receive a first set of pilot signals based at least in part on a periodic pilot transmission configuration, and receive a low latency burst comprising an embedded second set of pilot signals based at least in part on a burst pilot transmission configuration, wherein the burst pilot transmission configuration is different than the periodic pilot transmission configuration.

A non-transitory computer-readable medium storing code for wireless communication at a UE is described. The code may include instructions executable to receive a first set of pilot signals based at least in part on a periodic pilot transmission configuration, and receive a low latency burst comprising an embedded second set of pilot signals based at least in part on a burst pilot transmission configuration, wherein the burst pilot transmission configuration is different than the periodic pilot transmission configuration.

Some examples of the method, apparatuses, or non-transitory computer-readable medium described above may further include generating a long term channel estimate based at least in part on the first set of pilot signals. Additionally or alternatively, some examples may include generating an instantaneous channel estimate based at least in part on the second set of pilot signals.

Some examples of the method, apparatuses, or non-transitory computer-readable medium described above may further include demodulating the low latency burst utilizing the long term channel estimate and the instantaneous channel estimate. Additionally or alternatively, some examples may include transmitting a channel state information message to a base station based on the long term channel estimate.

Some examples of the method, apparatuses, or non-transitory computer-readable medium described above may further include updating a tracking loop based at least in part on the long term channel estimate. Additionally or alternatively, in some examples the low latency burst comprises one or more control channel transmissions.

Some examples of the method, apparatuses, or non-transitory computer-readable medium described above may further include converting the one or more control channel transmissions into pilot data for demodulation of the low latency burst. Additionally or alternatively, some examples may include refining a channel estimate based on the converted control channel.

Some examples of the method, apparatuses, or non-transitory computer-readable medium described above may further include receiving a subsequent low latency burst without pilots based on a subsequent burst transmission configuration. Additionally or alternatively, in some examples the burst pilot transmission configuration comprises a set of pilot signals embedded based on a rank one transmission.

In some examples of the method, apparatuses, or non-transitory computer-readable medium described above, the burst pilot transmission configuration comprises a set of pilot signals embedded based on a rank two transmission. Additionally or alternatively, in some examples the burst pilot transmission configuration comprises a higher pilot density than the periodic pilot transmission configuration.

In some examples of the method, apparatuses, or non-transitory computer-readable medium described above, the embedded second set of pilot signals are demodulation pilot signals.

A method of wireless communication at a base station is described. The method may include transmitting a first set of pilot signals based at least in part on a periodic pilot transmission configuration, embedding a second set of pilot signals in a low latency burst based at least in part on a burst pilot transmission configuration, wherein the burst pilot transmission configuration is different than the periodic pilot transmission configuration, and transmitting the low latency burst comprising the embedded second set of pilot signals.

An apparatus for wireless communication at a base station is described. The apparatus may include means for transmitting a first set of pilot signals based at least in part on a periodic pilot transmission configuration, means for embedding a second set of pilot signals in a low latency burst based at least in part on a burst pilot transmission configuration, wherein the burst pilot transmission configuration is different than the periodic pilot transmission configuration, and means for transmitting the low latency burst comprising the embedded second set of pilot signals.

A further apparatus for wireless communication at a base station is described. The apparatus may include a processor, memory in electronic communication with the processor, and instructions stored in the memory, wherein the instructions are executable by the processor to transmit a first set of pilot signals based at least in part on a periodic pilot transmission configuration, embed a second set of pilot signals in a low latency burst based at least in part on a burst pilot transmission configuration, wherein the burst pilot transmission configuration is different than the periodic pilot transmission configuration, and transmit the low latency burst comprising the embedded second set of pilot signals.

A non-transitory computer-readable medium storing code for wireless communication at a base station is described. The code may include instructions executable to transmit a first set of pilot signals based at least in part on a periodic pilot transmission configuration, embed a second set of pilot signals in a low latency burst based at least in part on a burst pilot transmission configuration, wherein the burst pilot transmission configuration is different than the periodic pilot transmission configuration, and transmit the low latency burst comprising the embedded second set of pilot signals.

Some examples of the method, apparatuses, or non-transitory computer-readable medium described above may further include selecting the burst pilot transmission configuration to comprise a higher pilot density than the periodic pilot transmission configuration. Additionally or alternatively, some examples may include selecting the burst pilot transmission configuration to comprise a set of pilot signals embedded in a data symbol with a tone density in a frequency domain corresponding to a channel power delay profile (PDP) of the low latency burst for a rank one transmission scheme.

Some examples of the method, apparatuses, or non-transitory computer-readable medium described above may further include selecting the burst pilot transmission configuration to comprise a set of pilot signals embedded in a data symbol with a tone density in a frequency domain corresponding to a channel PDP of the low latency burst for a rank two transmission scheme. Additionally or alternatively, some examples may include transmitting a subsequent low latency burst without a set of pilot signals based on a subsequent burst pilot transmission configuration.

In some examples of the method, apparatuses, or non-transitory computer-readable medium described above, the low latency burst comprises one or more control channel transmissions. Additionally or alternatively, in some examples the embedded second set of pilot signals are demodulation pilot signals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
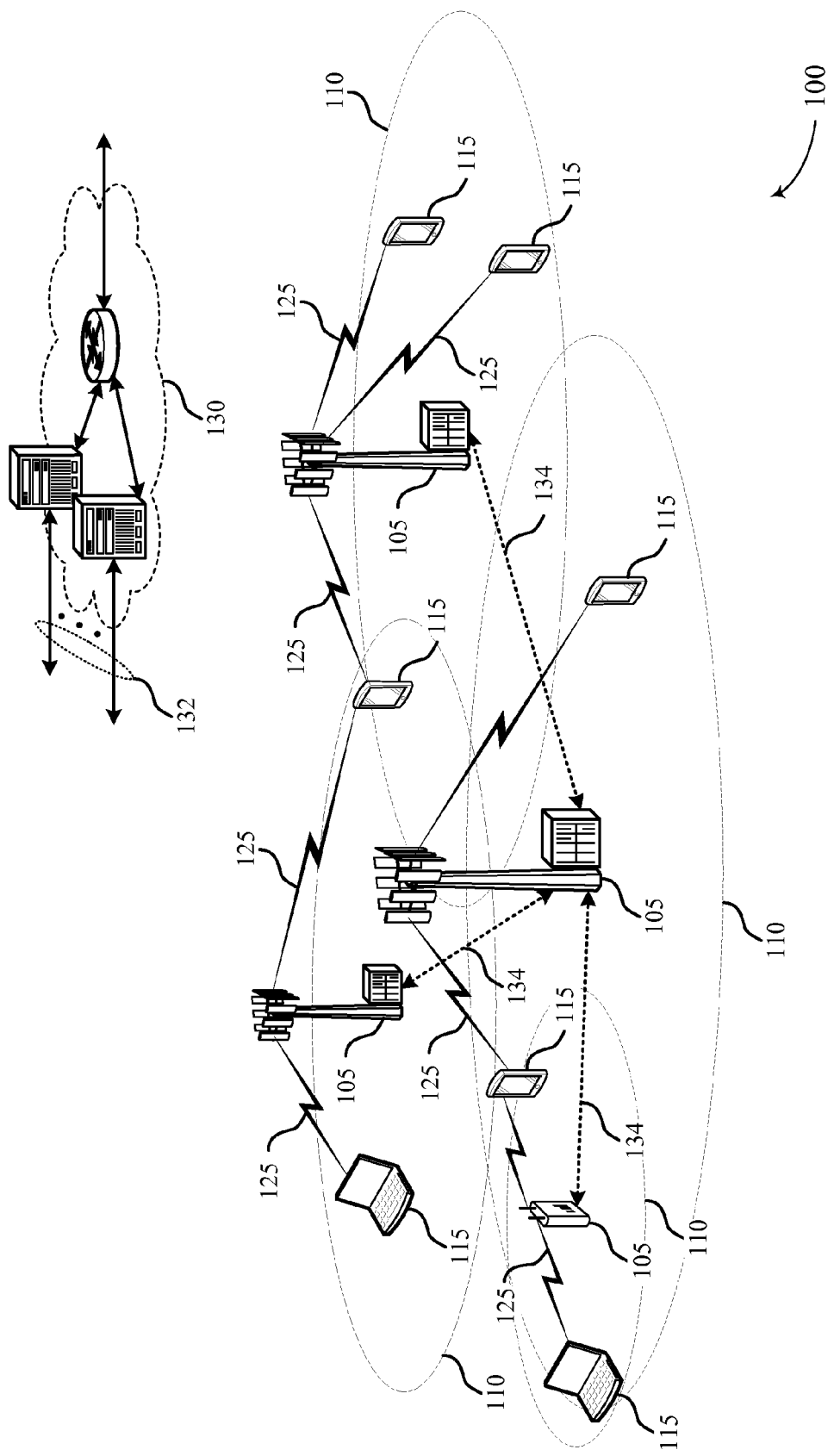
FIG. 1 illustrates an example of a wireless communications system for hybrid pilot design for low latency communication in accordance with various aspects of the present disclosure.

The described features generally relate to improved systems, methods, or apparatuses for hybrid pilot design for low latency communication. In some wireless communication systems, a periodic pilot system may be used to acquire channel estimates. However, for some applications (e.g., unpredictable or low latency burst traffic), periodic transmission may not sufficiently characterize a channel for demodulation. Thus, a wireless system may employ a hybrid pilot structure (e.g., using both periodic pilot and embedded pilots). Accordingly, long term channel statistics may be tracked by periodic pilots and instantaneous channel estimates may be made with embedded pilots (e.g., bursty pilots) and control signals.

A bursty pilot configuration may acquire an instantaneous channel estimate using demodulation pilots that are embedded in low latency data. This design scheme may reduce the periodic pilot overhead and may result in decreased periodic signaling with respect to the embedded pilots. The quality of the instantaneous channel estimate may be further enhanced by converting embedded control signals, which may be associated with low latency data, into pilots after the control information has been processed. The configuration may also be adapted using wide-band de-modulation reference signal (WB DMRS) pilots to obtain instantaneous channel estimates for communications utilizing multiple transmit antennas and beamforming. A periodic pilot may be used to capture long term parameter estimates (e.g., power delay profile (PDP), center of mass (COM), interference estimate, etc.) and thus enhance the channel estimate for low latency demodulation. The use of periodic pilots may also provide channel state feedback to determine channel quality, data rate, and rank for the UE. In some examples, periodic pilots may be used for tracking loop, and a demodulation reference signal (DMRS) pilot may be sent periodically to bootstrap the channel estimate of the embedded pilot.

Both periodic pilots and embedded pilots may be jointly processed to provide a channel estimate; low latency demodulation pilots may capture the instantaneous channel realization while periodic pilots may provide long term statistics used to improve the overall channel estimation quality. In some examples, the hybrid pilot structure may be used to develop interference estimates. For instance, low latency demodulation/control pilots may capture instantaneous interference characteristics while periodic pilots may be used to characterize long-term interference patterns. The instantaneous interference estimate may be classified according to different long term interference groups.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Time intervals in LTE may be expressed in multiples of a basic time unit (e.g., the sampling period, $T_s=1/30,720,000$ seconds). Time resources may be organized according to radio frames of length of 10 ms ($T_f=307200 \cdot T_s$, which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

In some wireless systems, such as in an LTE system, a base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signals (DMRS) may be directed toward specific UEs 115 and may be transmitted only on resource blocks assigned to those UEs 115. DMRS may include signals on 6 resource elements in each resource block in which they are transmitted. In some cases, two sets of DMRS may be transmitted in adjoining resource elements. In some cases, additional reference signals known as channel state information reference signals (CSI-RS) may be included to aid in generating CSI. On the UL, a UE 115 may transmit a combination of periodic sounding reference signals (SRS) and UL DMRS for link adaptation and demodulation, respectively.

According to the present disclosure, a base station 105 may select a hybrid pilot configuration including a relatively sparse periodic pilot and a dense pilot embedded in one or more symbols of a low latency burst. A UE 115 may generate a long term statistical average channel estimate based on the periodic pilot and an instantaneous channel estimate (e.g., for demodulation) based on the dense pilot embedded in the low latency burst. The UE 115 may refine the instantaneous channel estimate (i.e., perform time domain channel cleanup or windowing based on long term channel PDP) by converting a control channel embedded with the burst. In some instances, the base station 105 may embed the dense pilots in the first symbol of a burst and transmit subsequent low latency symbols with a reduced density pilot (or without pilot tones).

Figure 2:
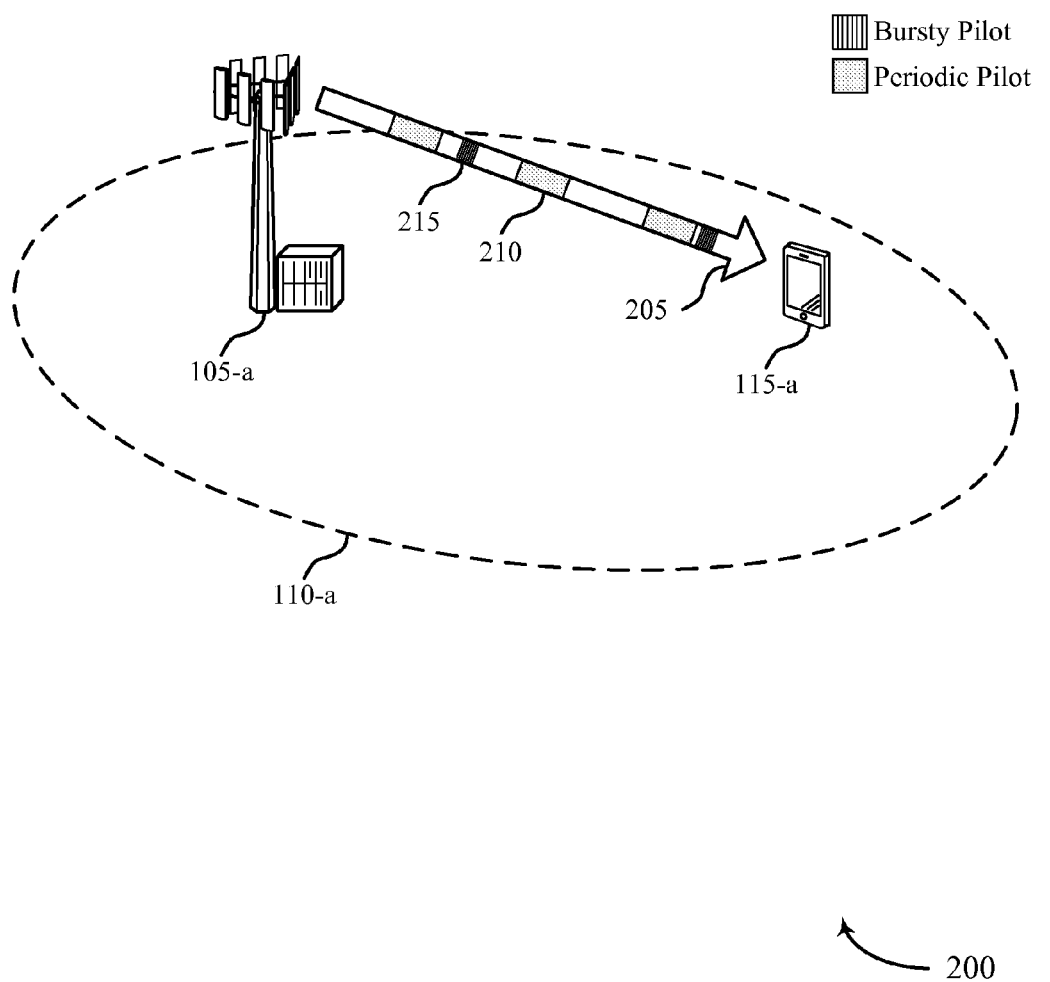
FIG. 2 illustrates an example of a wireless communications subsystem for hybrid pilot design for low latency communication in accordance with various aspects of the present disclosure.

FIG. 2 illustrates an example of a wireless communications subsystem 200 for hybrid pilot design for low latency communication in accordance with various aspects of the present disclosure. Wireless communications subsystem 200 may include a UE 115-a, which may be an example of a UE 115 described above with reference to FIG. 1. Wireless communications subsystem 200 may also include a base station 105-a, which may be an example of a base station 105 described above with reference to FIG. 1. Base station 105-a may communicate with UE 115-a via downlink 205, as generally described above with reference to FIG. 1. The communication may include data, control information, and pilot signals (e.g., demodulation pilots signals (DMRS), wideband DMRS (WBDMRS), cell specific reference signals (CRS), and the like).

In some cases base station 105-a may transmit periodic pilot signals 210, which may be used by UE 115-a to determine long term channel estimates and to reliably decode control signals. UE 115-a may use periodic pilots to characterize a channel and potentially improve communication quality. However, in some cases (e.g., for low latency data) long term channel estimates may not be sufficient to characterize the channel. For instance, low latency data may be susceptible to instantaneous channel fluctuations (e.g., interference), which may not be adequately captured by period pilots. Thus, wireless subsystem 200 may use a hybrid pilot structure which employs burst pilots for instantaneous channel estimates and periodic pilots for improved long term channel estimates. In some cases, the periodic pilot may not be beam formed the same way as bursty pilots. For example, periodic CSI-RS pilots may be used for channel statistics tracking and CSI feedback, whereas DMRS pilots may be used in beam formed bursts.

For example, downlink 205 may include both periodic pilot signals 210 and burst pilot signals 215. Periodic pilot signals 210 may be transmitted at fixed intervals to establish and maintain a long-term channel parameter estimates (e.g., power delay profile (PDP), center of mass (COM), interference, etc.). In some cases, periodic pilot signals 210 may provide channel state feedback to determine channel quality, data rate, and the rank which may be used at UE 115-a. Burst pilot signals 215 may embedded in low latency data and may be used to characterize short-term channel variations. Accordingly, during low latency transmissions, UE 115-a may use both long and short-term channel estimates to decode control signals. In some cases, the embedded pilot and control signals may be used to capture instantaneous interference characteristics and the periodic pilot signals may be used to characterize long term interference patterns. Although described with reference to downlink 205, subsystem 200 may use a hybrid pilot structure for communications from UE 115-a to base station 105-a (e.g., via the uplink).

Thus, base station 105-a may select a hybrid pilot configuration including relatively sparse periodic pilot signals 210 and burst pilot signals 215. UE 115-a may generate a long term statistical average channel estimate based on periodic pilot signals 210 and an instantaneous channel estimate (e.g., for demodulation) based on the dense burst pilot signals 215. The UE 115 may refine the instantaneous channel estimate (i.e., perform time domain channel cleanup or windowing based on long term channel PDP) by converting a control channel embedded with the burst. In some instances, base station 105-a may embed burst pilot signals 215 in the first symbol of a burst and transmit subsequent low latency symbols with a reduced density pilot (or without pilot tones).

Figure 3A:
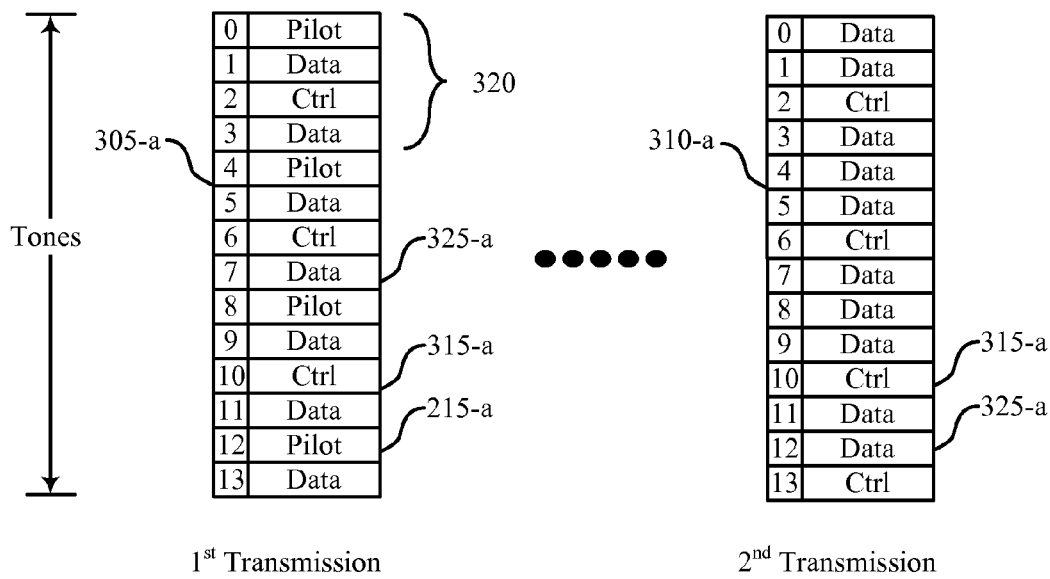
FIG. 3A illustrates an example of a transmission structure for hybrid pilot design for low latency communication in accordance with various aspects of the present disclosure.

FIG. 3A illustrates an example of a burst pilot transmission structure 301 for hybrid pilot design for low latency communication in accordance with various aspects of the present disclosure. Burst pilot transmission structure 301 may illustrate aspects of a transmission between a UE 115 and a base station 105, as described above with reference to FIGS. 1-2. Burst pilot transmission structure 301 may include a first transmission 305-a with embedded burst pilot signals 215-a and a second transmission 310-a without embedded pilots. Transmission 305-a and transmission 305-b may include data resource elements 325-a and control signals 315-a spread over a number of tones. A UE 115 may use embedded burst pilot signals 215-*a* to derive an instantaneous channel estimate, and subsequently decode control signals 315-*a*. Furthermore, a UE 115 may convert the decoded control signals 315-*a* into pilot data to refine the instantaneous channel estimate as well as demodulate the low latency burst 305-*a*. For example, the UE 115 may perform time domain channel clean-up or windowing based on long term channel PDP.

For example, first low latency transmission 305-*a* may be received at a rank 1 receiver (e.g., at a UE). According to in burst pilot transmission structure 301, a burst pilot signal 215-*a* may be embedded every fourth tone (e.g., for every 4 tones 320, there may be two data resource elements 325-*a*, one control signal 315-*a*, and one burst pilot signal 215-*a*). Burst pilot signals 215-*a* may be used by a UE 115 to obtain an instantaneous channel estimate so that control signals 315-*a* may be decoded. A second low latency transmission 310-*a* may occur shortly after the first low latency transmission 305-*a*. The second low latency transmission 310-*a* may not include embedded burst pilot signals 215-*a* with the low latency data but may instead replace the burst pilot signals 215-*a* with data resource elements 325-*a*. An embedded control signal 315-*a* may be decoded using the instantaneous channel estimate from the first low latency transmission 305-*a*. When the control signals 315-*a* has been decoded, the control signals 315-*a* may be converted into pilot data which may be used to further refine the channel estimate for demodulation of data resource elements 325-*a*.

In some examples, burst pilot transmission structure 301 may be used in conjunction with a low latency burst (e.g., one that includes control and low latency data) received at a rank one receiver. In such a scenario, burst pilot signals 215-*a* may be embedded every fourth tone of the low latency burst. The burst pilot signals 215-*a* may be used to obtain an instantaneous channel estimate so that control symbols may be decoded. Once the control symbol is decoded, the data may subsequently be decoded. The second low latency burst 310-*a* may occur shortly after the first low latency burst 305-*a*. The second low latency burst 310-*a* may not include embedded pilots with the low latency data, and a control symbol may be decoded using the channel estimate from the first low latency burst. When the control symbol has been decoded, the control symbol may then be converted into a pilot symbol which may further refine the channel estimate.

Figure 3B:
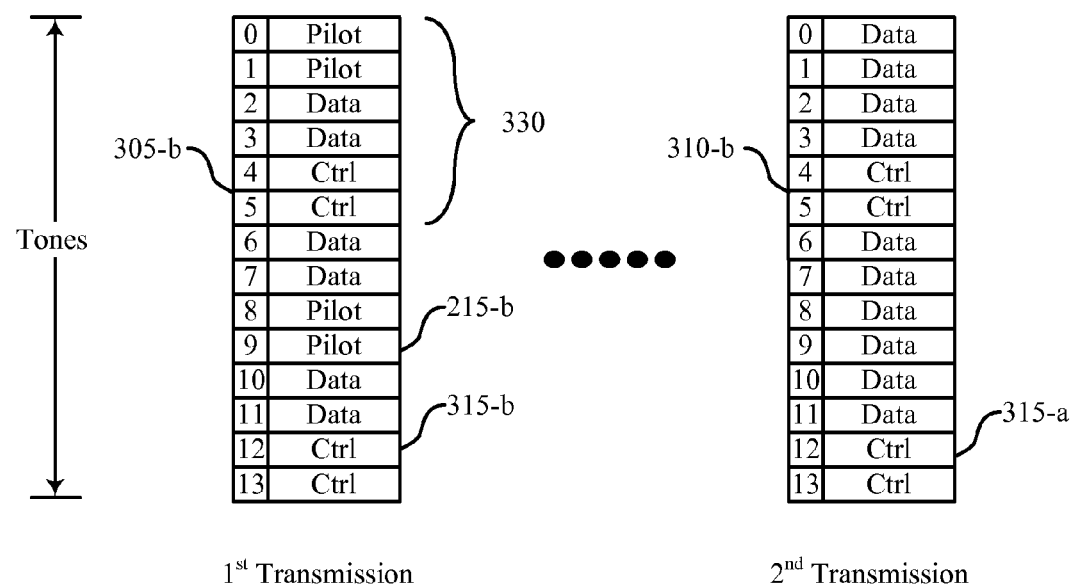
FIG. 3B illustrates an example of a transmission structure for hybrid pilot design for low latency communication in accordance with various aspects of the present disclosure.

FIG. 3B illustrates an example of a burst pilot transmission structure 302 for hybrid pilot design for low latency communication in accordance with various aspects of the present disclosure. Burst pilot transmission structure 302 may be aspects of a transmission between a UE 115 and a base station 105, as described above with reference to FIGS. 1-2. Burst pilot transmission structure 302 may include a first transmission 305-*b* with embedded burst pilot signals 215-*b* and a second transmission 310-*b* without embedded pilots. A UE 115 may use embedded burst pilot signals 215-*b* to derive an instantaneous channel estimate, and subsequently decode control signals 315-*b*. Furthermore, a UE 115 may convert the decoded control signals 315-*b* into pilot signals to refine the instantaneous channel estimate for transmission 310-*b* (i.e., perform time domain channel clean-up or windowing based on long term channel PDP).

For example, burst pilot transmission structure 302 may include a first low latency transmission 305-*b*, which may be received at a rank 2 receiver (e.g., at a UE 115). A set of burst pilot signals 215-*b* may be embedded on contiguous tones (e.g., where two transmit ports are frequency division multiplexed or code division multiplexed). For example, a set of 6 tones 330 may include two burst pilots signals 215-*b*, two control signals 315-*b*, and two data resource elements 325-*a*. After first transmission 305-*b*, a UE 115 may use burst pilot signals 215-*b* to derive an instantaneous channel estimate which may be used to decode control signals 315-*b*. A second low latency transmission 310-*b* may occur after transmission 305-*b*, and may not include pilots for channel estimation. Instead, a UE 115 may use the instantaneous channel estimate of first transmission 305-*b* to decode control signals 315-*b*. Once control signals 315-*b* have been decoded, the UE 115 may convert them into pilot signals and thus refine the instantaneous channel estimate.

In some examples, burst pilot transmission structure 302 may be used in conjunction with a low latency burst (e.g., one including pairs of data symbols and control symbols) received at a rank two receiver. In such a scenario, two burst pilot signals 215-*b* may be embedded in contiguous tones at the beginning of the allocated resources. In yet another example, the burst pilot signals 215-*b* may be embedded when it is discovered that low latency traffic is being used, otherwise, the pilot and control structure may be optimized to most efficiently accommodate the current channel traffic.

Figure 4:
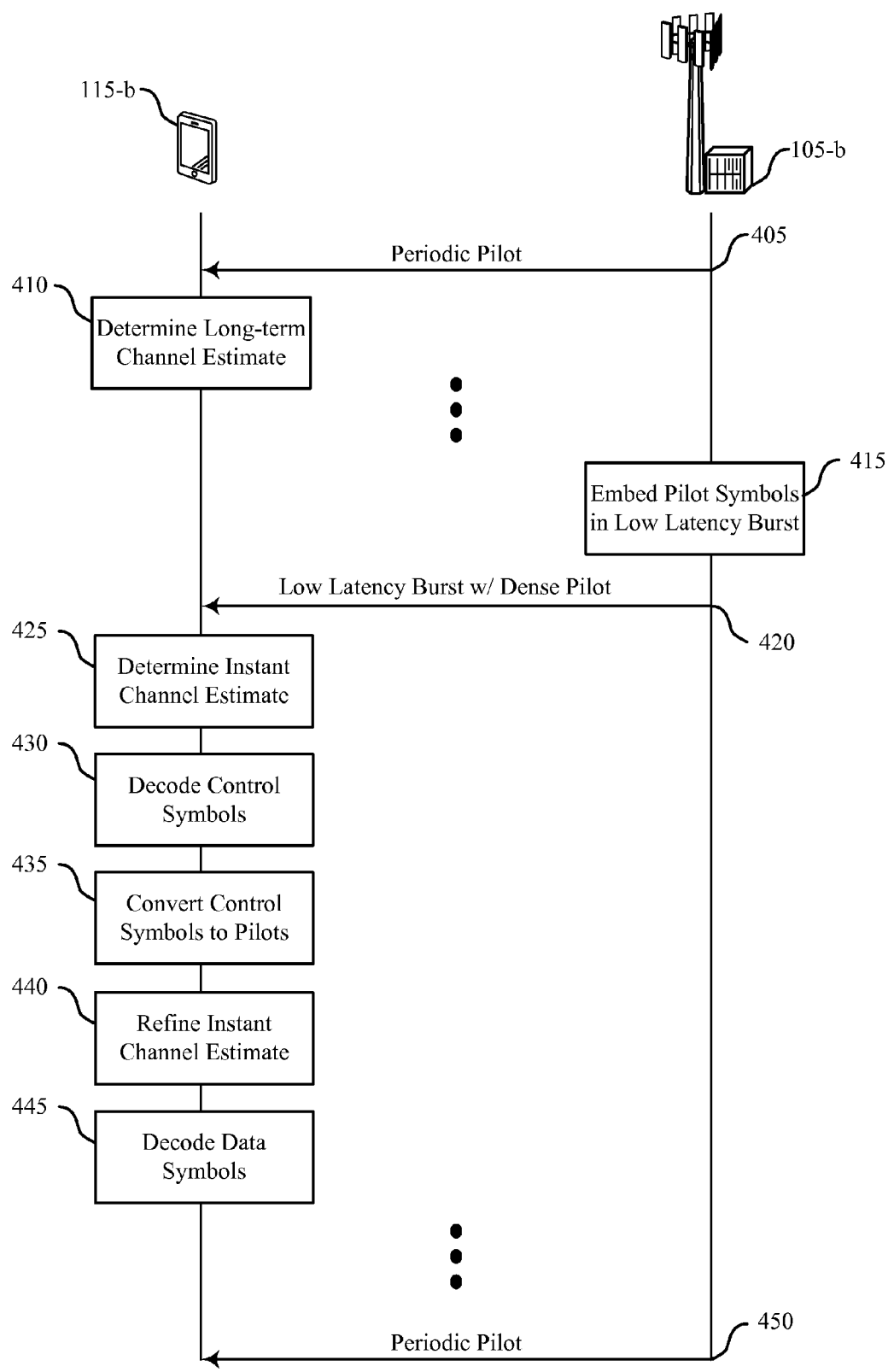
FIG. 4 illustrates an example of a process flow for hybrid pilot design for low latency communication in accordance with various aspects of the present disclosure.

FIG. 4 illustrates an example of a process flow 400 for hybrid pilot design for low latency communication in accordance with various aspects of the present disclosure. Process flow 400 may include a UE 115-*b*, which may be an example of a UE 115 described above with reference to FIGS. 1-2. Process flow 400 may also include a base station 105-*b*, which may be an example of a base station 105 described above with reference to FIGS. 1-2. Process flow may be an aspect of a burst pilot transmission structure as described above with reference to FIGS. 3A and 3B.

At step 405, after selecting a pilot configuration, base station 105-*b* may transmit a first set of periodic pilot signals to UE 115-*b*. The pilot signals may be based on a periodic pilot transmission configuration. UE 115-*b* may receive periodic pilot signals at step 405, and at step 410 UE 115-*b* may generate a long term channel estimate based at least in part on the first set of pilots. In some cases, UE 115-*b* may transmit a channel state information message to a base station based on the long term channel estimate. In this or other cases, UE 115-*a* may update a tracking loop based at least in part on the long term channel estimate.

At step 415, base station 105-*b* may embed a second set of pilot signals in a low latency burst based on a burst pilot transmission configuration. In some cases, base station 105-*b* may select the burst pilot transmission configuration to include a set of pilot signals embedded in a data symbol with a tone density in a frequency domain corresponding to a channel power delay profile (PDP) of the low latency burst for a rank one transmission scheme. In another instance, base station 105-*b* may select the burst pilot transmission configuration to include a set of pilot signals embedded in a data symbol with a tone density in a frequency domain corresponding to a channel PDP of the low latency burst for a rank two transmission scheme.

At step 420, base station 105-*b* may transmit, and UE 115-*b* may receive, the low latency burst including the embedded second set of pilot signals (e.g., demodulation pilot signals). In some examples, the low latency burst may include one or more control channel transmissions. In some cases, the embedded second set of pilot signals may be based on a burst pilot transmission configuration which may be different than the periodic pilot transmission configuration (e.g., the burst pilot transmission configuration comprises a higher pilot density than the periodic pilot transmission configuration). In some examples the burst pilot transmission configuration may include a set of pilot signals embedded based on a rank one transmission. In other examples, the burst pilot transmission configuration may include a set of pilot signals embedded based on a rank two transmission. At step 425, UE 115-*b* may determine an instantaneous channel estimate based at least in part on the embedded pilots. In some cases, base station 105-*b* may transmit a subsequent low latency burst without a set of pilot signals based on a subsequent burst pilot transmission configuration.

At step 430, UE 115-*a* may decode the control channel signals using the instantaneous channel estimate. In some cases UE 115-*b* may use the instantaneous channel estimate (e.g., one derived from embedded pilots) in conjunction with the long term channel estimate (e.g., one derived from periodic pilots) to decode the control symbols. At step 435, UE 115-*a* may convert the one or more control channel transmissions into pilot data for demodulation of the low latency burst.

At step 440, UE 115-*b* may refine a channel estimate based on the converted control channel. At step 445, UE 115-*b* may decode the data included in the low latency burst using the refined channel estimate. At step 450, base station 105-*b* may transmit the periodic pilot signals to UE 115-*b*, according to the periodic pilot transmission configuration.

Figure 5:
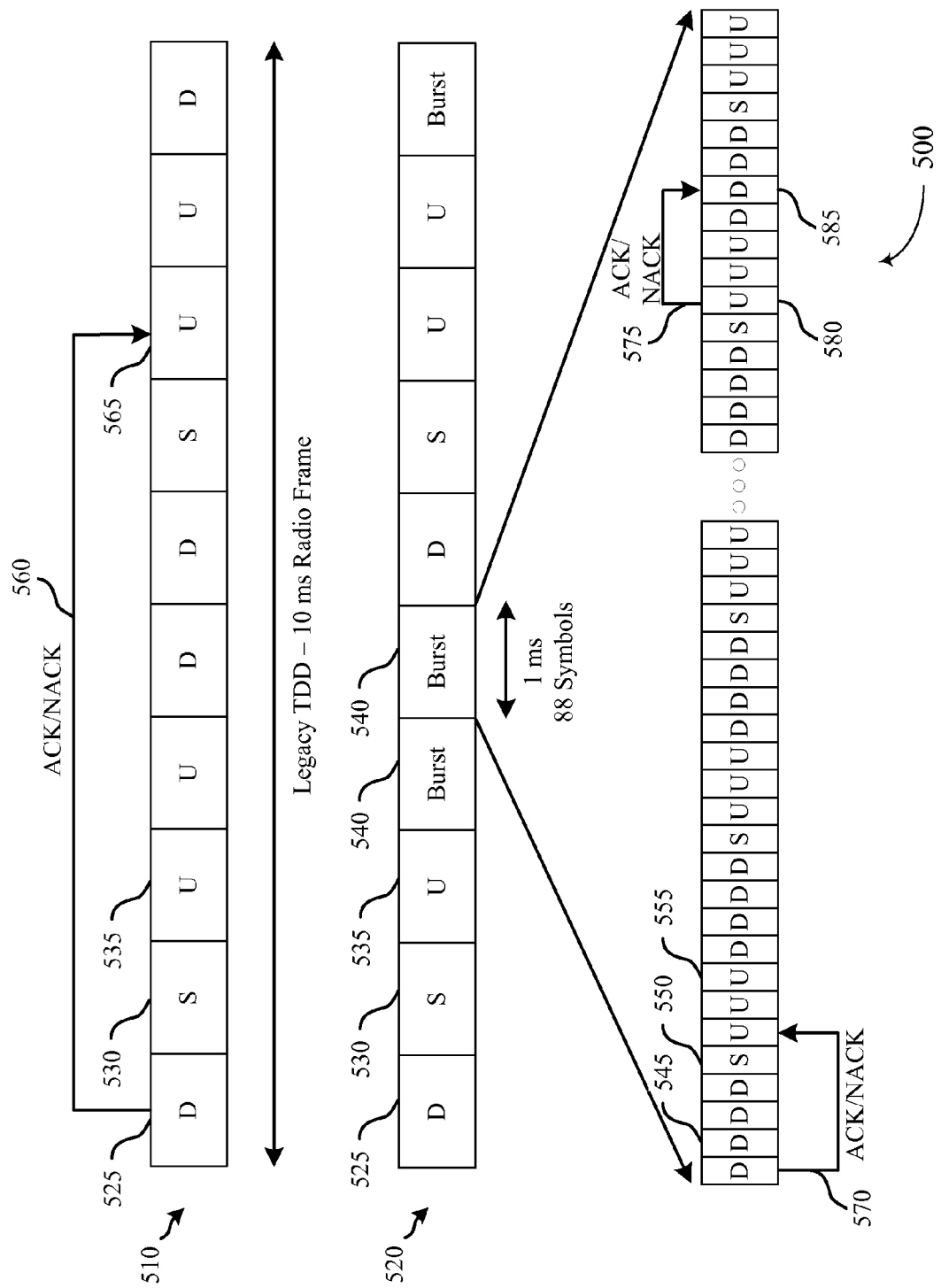
FIG. 5 illustrates an example of a low latency burst structure for hybrid pilot design for low latency communication in accordance with various aspects of the present disclosure.

FIG. 5 illustrates an example of a low latency burst structure 500 for hybrid pilot design for low latency communication in accordance with various aspects of the present disclosure. In some cases, a wireless communications system (e.g., wireless communication system 100 of FIG. 1) may have more than one hierarchical physical layer structure. For example, a second hierarchical layer may have lower latency compared to the first hierarchical layer. A radio frame 510 may include ten 1 ms subframes that include DL subframes 525, special subframes 530, and UL subframes 535, each of which may be used to transmit data symbols. The pilot configurations described in this disclosure may be used in conjunction with a time division duplexing (TDD) or an frequency division duplexing (FDD) frame structure, either of which may include a reduced symbol duration for low latency bursts. Low latency burst structure 500 may illustrate a burst structure for TDD. However, a FDD system may also include a low latency burst structure. In the FDD case, the system may not include special subframes 530 for switching a radio from UL to DL or vice versa.

A number of DL subframes 525 may be replaced with burst subframes 540 which may be transmitted according to a different hierarchical layer than DL subframes 525, special subframes 530, and UL subframes 535 (e.g., in the second layer). In some examples, Burst subframes 540 may include a greater number of symbols than subframes in the first hierarchical layer (e.g., 88 symbols rather than 14 symbols), and may include DL symbols 545, special symbols 550, and UL symbols 555. In some cases, the symbols 545, 550, and 555 may have a reduced symbol duration relative to the symbols transmitted according to the first hierarchical layer. The reduced symbol duration may enable acknowledgment of transmissions with a reduced latency.

In first layer TDD frame 510, a UE 115 may receive a DL transmission in DL subframe 525 and transmit an acknowledgement (ACK) according to a first layer HARQ scheme in which ACKs are transmitted in a first available subframe at or after k+4 subframes following the receipt of a DL transmission. In some cases, subframe k+4 from DL subframe 525 may be another DL subframe, and an ACK/NACK 560 may be transmitted in following UL subframe 565. Thus, in this example, there is a 7 ms delay between DL subframe 525 and the ACK/NACK 560 associated with the subframe. In the event that a retransmission is appropriate (e.g., after receiving a negative acknowledgement (NACK)), the retransmission may be scheduled for a subsequent DL subframe. The retransmission timing may result in a relatively long round trip time (RTT) (e.g., a minimum of 11 ms). If an acknowledgment is sent in the fourth subframe following a DL transmission (in FDD mode ACK/NACK may be consistently transmitted in subframe k+4), the minimum RTT may be 8 ms.

Within burst subframes 540, the latency for providing ACKs may be less than the latency for transmissions in the first hierarchical layer. In some cases, transmissions using the second hierarchical layer may utilize similar HARQ techniques as with first layer transmissions. That is, ACKs may be provided in symbol k+4 (where k represents the original symbol transmission), or in a first available symbol for transmission afterward. In some cases, an offset other than 4 may be used for the second hierarchical layer. For example, a UE 115 may receive a DL transmission in symbol 545 and provide an ACK/NACK 570 in UL symbol 555, which is five symbols after the receipt of DL transmission in DL symbol 545 (because the fourth symbol following the transmission is a special symbol 550).

Thus, the UE 115 may provide ACK/NACK 570 of the DL transmission within the burst subframe 540, which is less than 1 ms following the receipt of the DL transmission in DL symbol 545. In some examples, similarly as discussed above with respect to FIG. 3A, the symbol duration for symbols in the burst subframe 540 may be 11.36 µs, resulting in an acknowledgment being provided in this example 56.8 µs following the DL symbol 545 transmission. The eNB may then schedule any required retransmission and thus may provide, in some examples, a resulting RTT of approximately 100 µs or less.

While ACK/NACK 570 is described with respect to a UE 115 receiving a DL symbol 545, similar functions may be performed for UL transmissions. For example, a UE may transmit an UL symbol 580 to an eNB, which may be acknowledged by the eNB through ACK/NACK 575 that is provided in DL symbol 585. In the even that a retransmission is necessary, such a retransmission may be provided in a subsequent UL symbol from the UE and thus may again provide, in some examples, a resulting RTT of approximately 100 µs or less. Accordingly, latency associated with transmissions in burst subframes 540 may be significantly reduced. Such reduced latency may enable enhanced data rates, through reduced RTTs which may reduce overall retransmission times.

A base station may select a hybrid pilot configuration including a relatively sparse periodic pilot and a dense pilot embedded in one or more symbols of a low latency burst. A user equipment (UE) may generate a long term statistical average channel estimate based on the periodic pilot and an instantaneous channel estimate (e.g., for demodulation) based on the dense pilot embedded in the low latency burst. The UE may refine the instantaneous channel estimate by converting a control channel embedded with the burst. In some instances, the base station may embed the dense pilots in the first symbol of a burst and transmit subsequent low latency symbols with a reduced density pilot (or without pilot tones).

Figure 6:
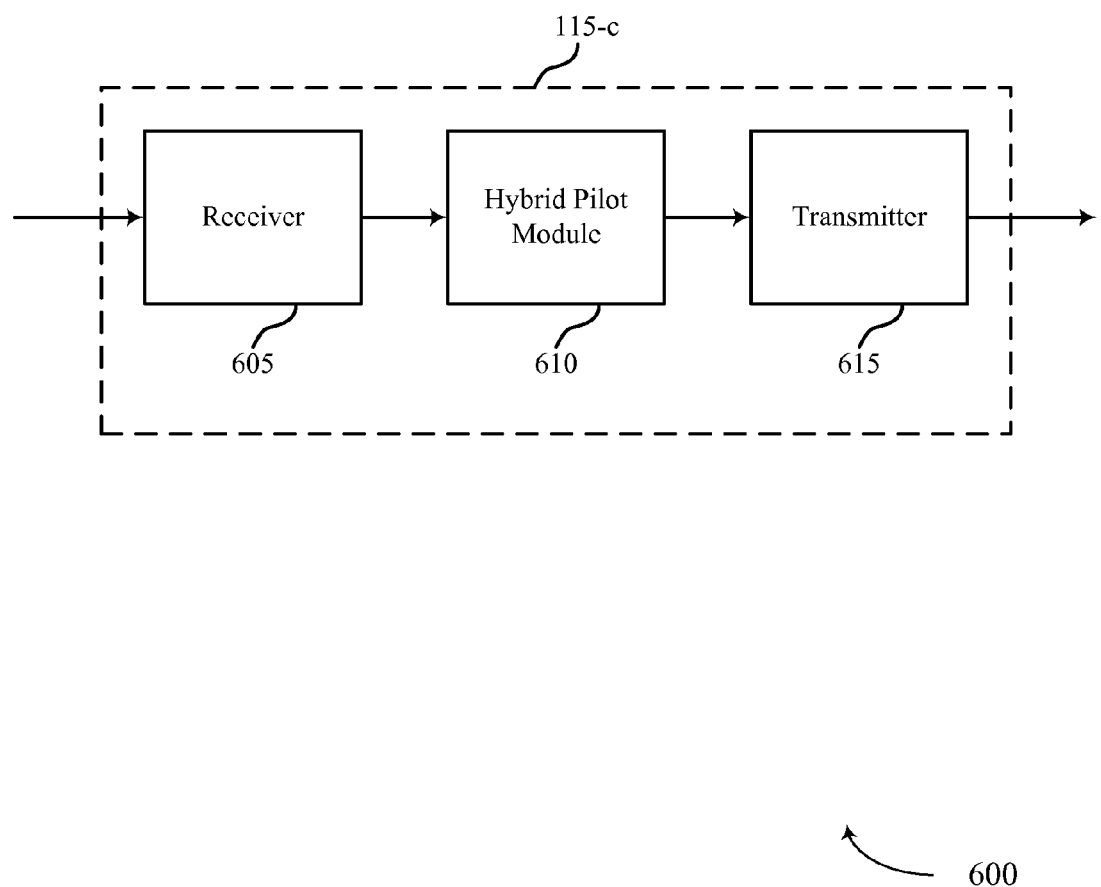
FIG. 6 shows a block diagram of a user equipment (UE) configured for hybrid pilot design for low latency communication in accordance with various aspects of the present disclosure.

FIG. 6 shows a block diagram 600 of a UE 115-*c* configured for hybrid pilot design for low latency communication in accordance with various aspects of the present disclosure. UE 115-*c* may be an example of aspects of a UE 115 described with reference to FIGS. 1-5. UE 115-*c* may include a receiver 605, a hybrid pilot module 610, or a transmitter 615. UE 115-*c* may also include a processor. Each of these components may be in communication with each other.

The components of UE 115-*c* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 605 may receive information such as packets, user data, or control information associated with various information channels (e.g., control channels, data channels, and information related to hybrid pilot design for low latency communication, etc.). Information may be passed on to the hybrid pilot module 610, and to other components of UE 115-*c*. In some examples, the receiver 605 may receive a subsequent low latency burst without pilots based on a subsequent burst transmission configuration.

The hybrid pilot module 610 may receive a first set of pilot signals based at least in part on a periodic pilot transmission configuration, and receive a low latency burst comprising an embedded second set of pilot signals based at least in part on a burst pilot transmission configuration, wherein the burst pilot transmission configuration is different than the periodic pilot transmission configuration.

The transmitter 615 may transmit signals received from other components of UE 115-*c*. In some embodiments, the transmitter 615 may be collocated with the receiver 605 in a transceiver module. The transmitter 615 may include a single antenna, or it may include a plurality of antennas. In some examples, the transmitter 615 may transmit a channel state information message to a base station based on the long term channel estimate.

Figure 7:
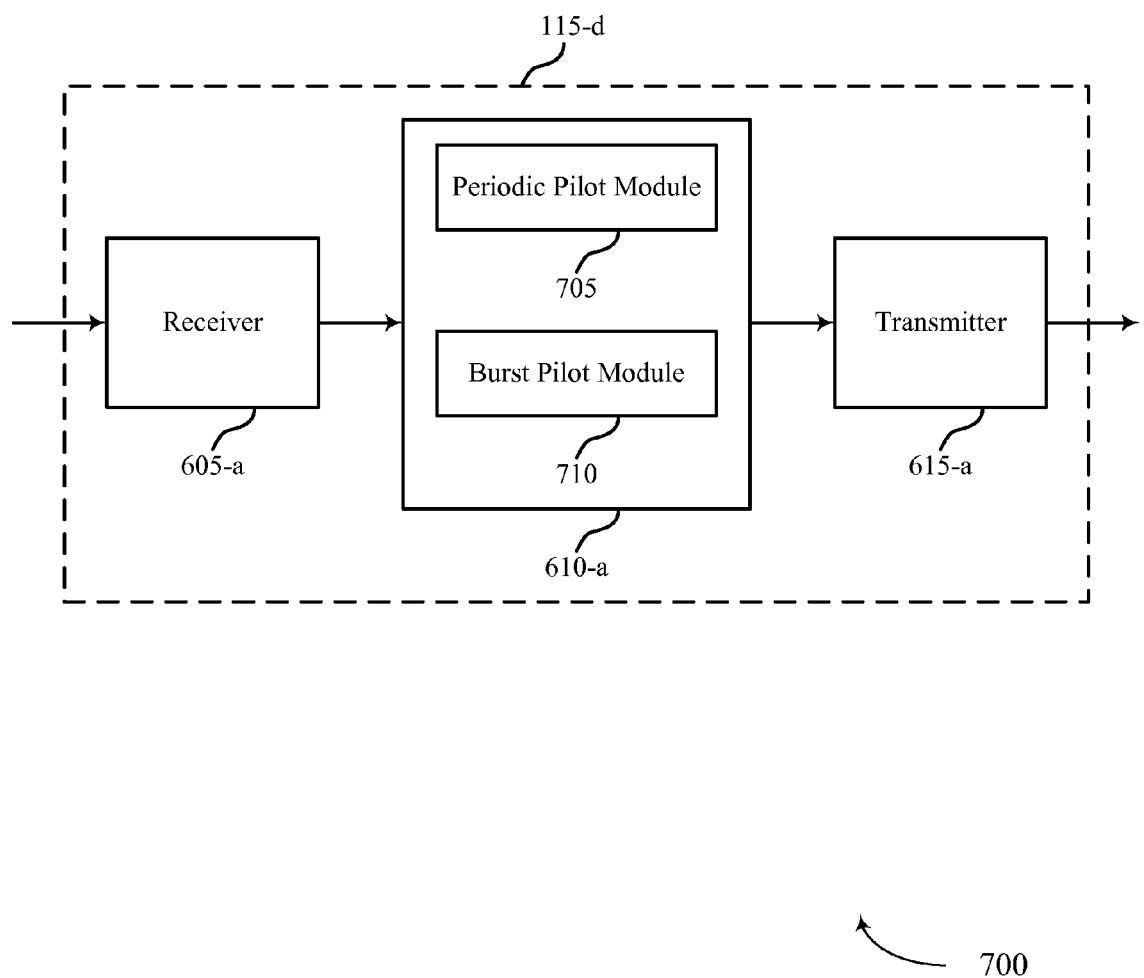
FIG. 7 shows a block diagram of a UE configured for hybrid pilot design for low latency communication in accordance with various aspects of the present disclosure.

FIG. 7 shows a block diagram 700 of a UE 115-*d* for hybrid pilot design for low latency communication in accordance with various aspects of the present disclosure. UE 115-*d* may be an example of aspects of a UE 115 described with reference to FIGS. 1-6. UE 115-*d* may include a receiver 605-*a*, a hybrid pilot module 610-*a*, or a transmitter 615-*a*. UE 115-*d* may also include a processor. Each of these components may be in communication with each other. The hybrid pilot module 610-*a* may also include a periodic pilot module 705, and a burst pilot module 710.

The components of UE 115-*d* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 605-*a* may receive information which may be passed on to hybrid pilot module 610-*a*, and to other components of UE 115-*d*. The hybrid pilot module 610-*a* may perform the operations described above with reference to FIG. 6. The transmitter 615-*a* may transmit signals received from other components of UE 115-*d*.

The periodic pilot module 705 may receive a first set of pilot signals based at least in part on a periodic pilot transmission configuration as described above with reference to FIGS. 2-5.

The burst pilot module 710 may receive a low latency burst comprising an embedded second set of pilot signals based at least in part on a burst pilot transmission configuration, wherein the burst pilot transmission configuration is different than the periodic pilot transmission configuration as described above with reference to FIGS. 2-5. In some examples, the burst pilot transmission configuration comprises a higher pilot density than the periodic pilot transmission configuration. In some examples, the embedded second set of pilot signals are demodulation pilot signals.

Figure 8:
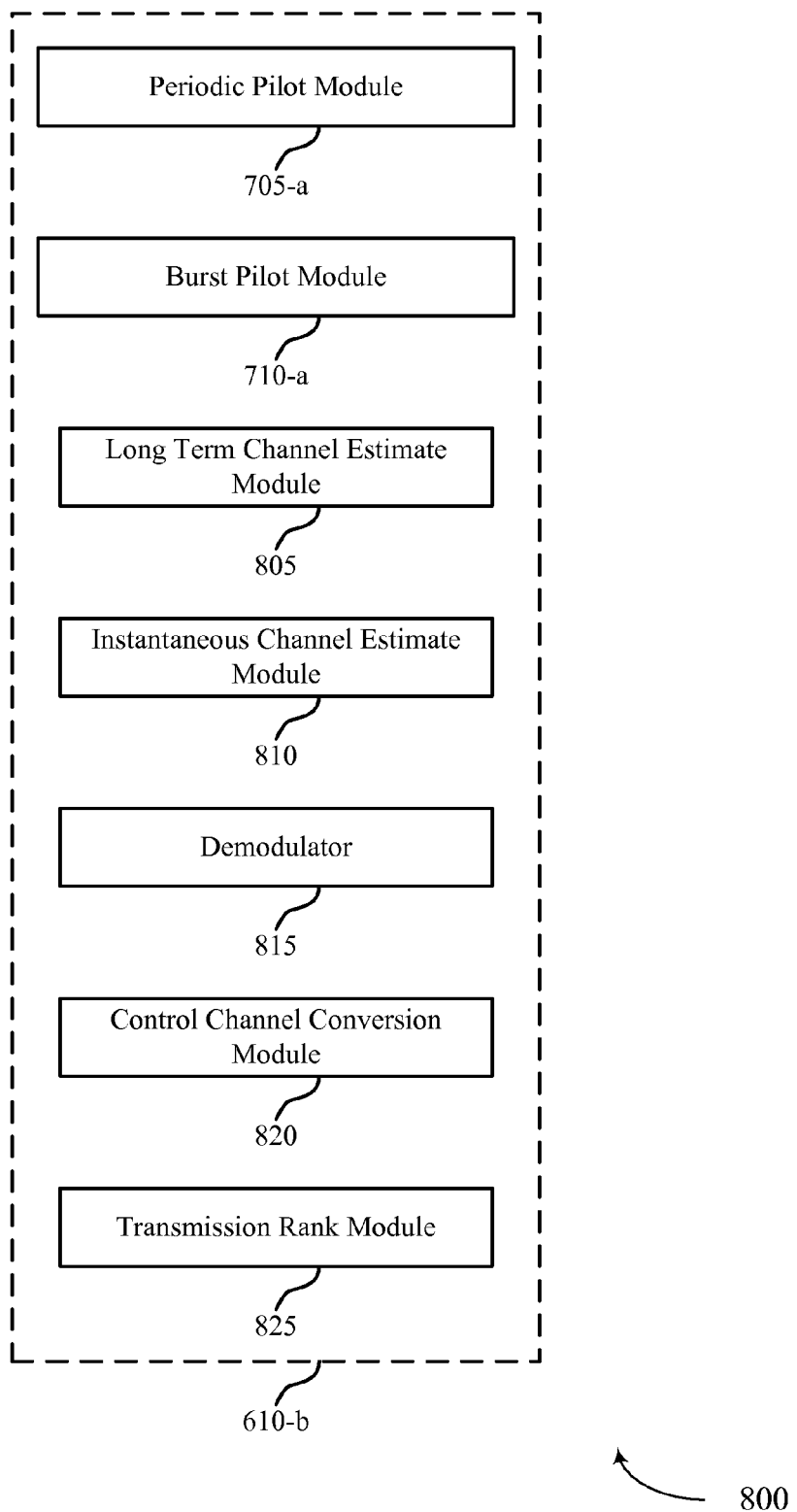
FIG. 8 shows a block diagram of a hybrid pilot module configured for hybrid pilot design for low latency communication in accordance with various aspects of the present disclosure.

FIG. 8 shows a block diagram 800 of a hybrid pilot module 610-*b* for hybrid pilot design for low latency communication in accordance with various aspects of the present disclosure. The hybrid pilot module 610-*b* may be an example of aspects of a hybrid pilot module 610 described with reference to FIGS. 6-7. The hybrid pilot module 610-*b* may include a periodic pilot module 705-*a*, and a burst pilot module 710-*a*. Each of these modules may perform the functions described above with reference to FIG. 7. The hybrid pilot module 610-*b* may also include a long term channel estimate module 805, an instantaneous channel estimate module 810, a demodulator 815, a control channel conversion module 820, and a transmission rank module 825.

The components of the hybrid pilot module 610-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The long term channel estimate module 805 may generate a long term channel estimate based at least in part on the first set of pilot signals as described above with reference to FIGS. 2-5.

The instantaneous channel estimate module 810 may generate an instantaneous channel estimate based at least in part on the second set of pilot signals as described above with reference to FIGS. 2-5. The instantaneous channel estimate module 810 may also refine a channel estimate based on the converted control channel.

The demodulator 815 may demodulate the low latency burst utilizing the long term channel estimate and the instantaneous channel estimate as described above with reference to FIGS. 2-5.

The control channel conversion module 820 may be configured such that the low latency burst may include one or more control channel transmissions as described above with reference to FIGS. 2-5. The control channel conversion module 820 may also convert the one or more control channel transmissions into pilot data for demodulation of the low latency burst.

The transmission rank module 825 may be configured such that the burst pilot transmission configuration may include a set of pilot signals embedded based on a rank one transmission as described above with reference to FIGS. 2-5. In some examples, the burst pilot transmission configuration comprises a set of pilot signals embedded based on a rank two transmission.

Figure 9:
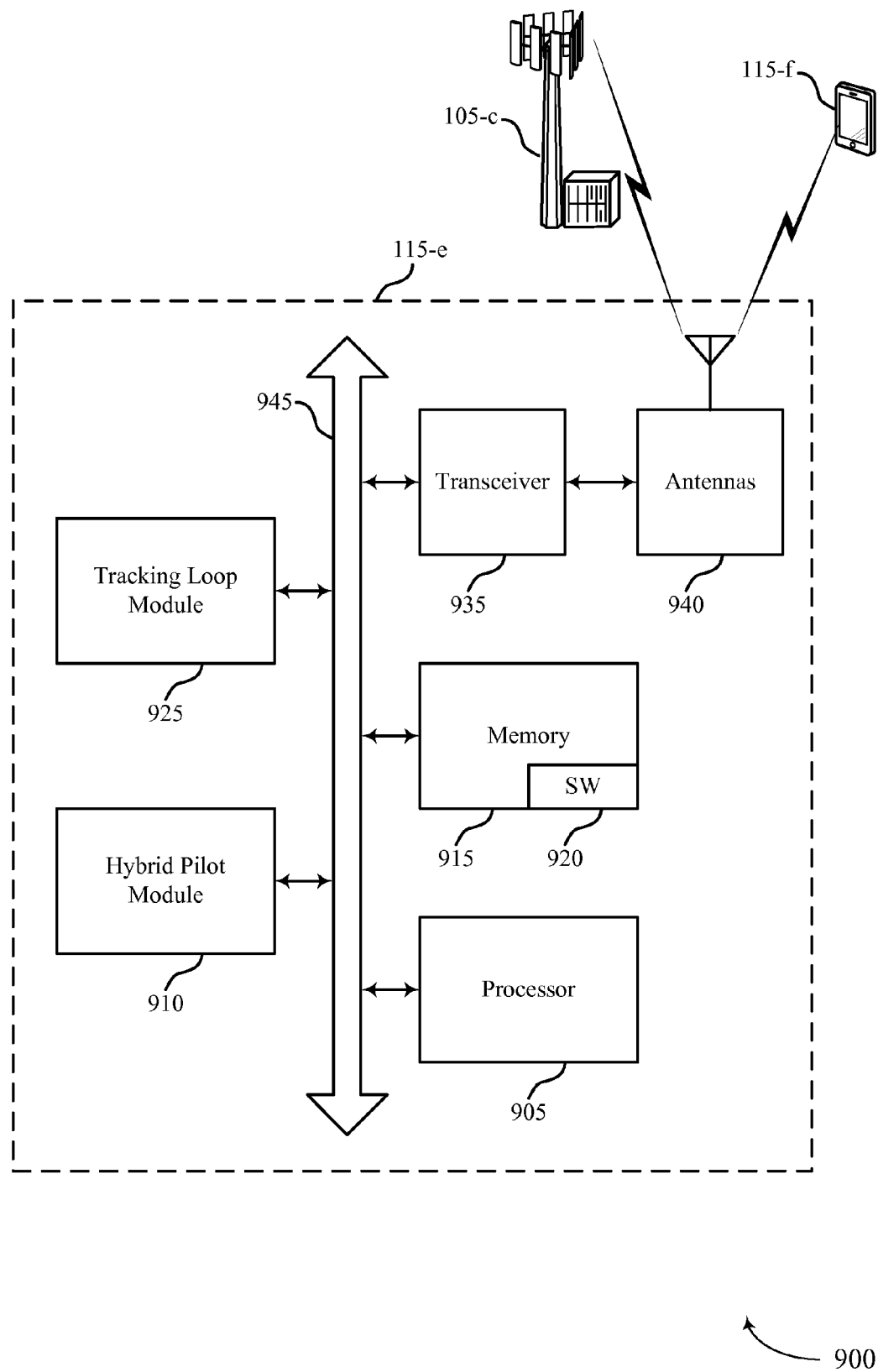
FIG. 9 illustrates a block diagram of a system including a UE configured for hybrid pilot design for low latency communication in accordance with various aspects of the present disclosure.

FIG. 9 shows a diagram of a system 900 including a UE 115 configured for hybrid pilot design for low latency communication in accordance with various aspects of the present disclosure. System 900 may include UE 115-e, which may be an example of a UE 115 described above with reference to FIGS. 1-8. UE 115-e may include a hybrid pilot module 910, which may be an example of a hybrid pilot module 610 described with reference to FIGS. 6-8. UE 115-e may also include a tracking loop module 925. UE 115-e may also include components for bi-directional voice and data communications including components for transmitting communications and components for receiving communications. For example, UE 115-e may communicate bi-directionally with UE 115-f or base station 105-c.

The tracking loop module 925 may update a tracking loop based at least in part on the long term channel estimate as described above with reference to FIGS. 2-5. For example, tracking loop module 925 may be used for robust frequency tracking to ensure UE 115-e is using the correct frequency for RF to baseband conversion.

UE 115-e may also include a processor module 905, and memory 915 (including software (SW)) 920, a transceiver module 935, and one or more antenna(s) 940, each of which may communicate, directly or indirectly, with one another (e.g., via buses 945). The transceiver module 935 may communicate bi-directionally, via the antenna(s) 940 or wired or wireless links, with one or more networks, as described above. For example, the transceiver module 935 may communicate bi-directionally with a base station 105 or another UE 115. The transceiver module 935 may include a modem to modulate the packets and provide the modulated packets to the antenna(s) 940 for transmission, and to demodulate packets received from the antenna(s) 940. While UE 115-e may include a single antenna 940, UE 115-e may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., hybrid pilot design for low latency communication, etc.). Alternatively, the software/firmware code 920 may not be directly executable by the processor module 905 but cause a computer (e.g., when compiled and executed) to perform functions described herein. The processor module 905 may include an intelligent hardware device, (e.g., a central processing unit (CPU), a microcontroller, an ASIC, etc.)

Figure 10:
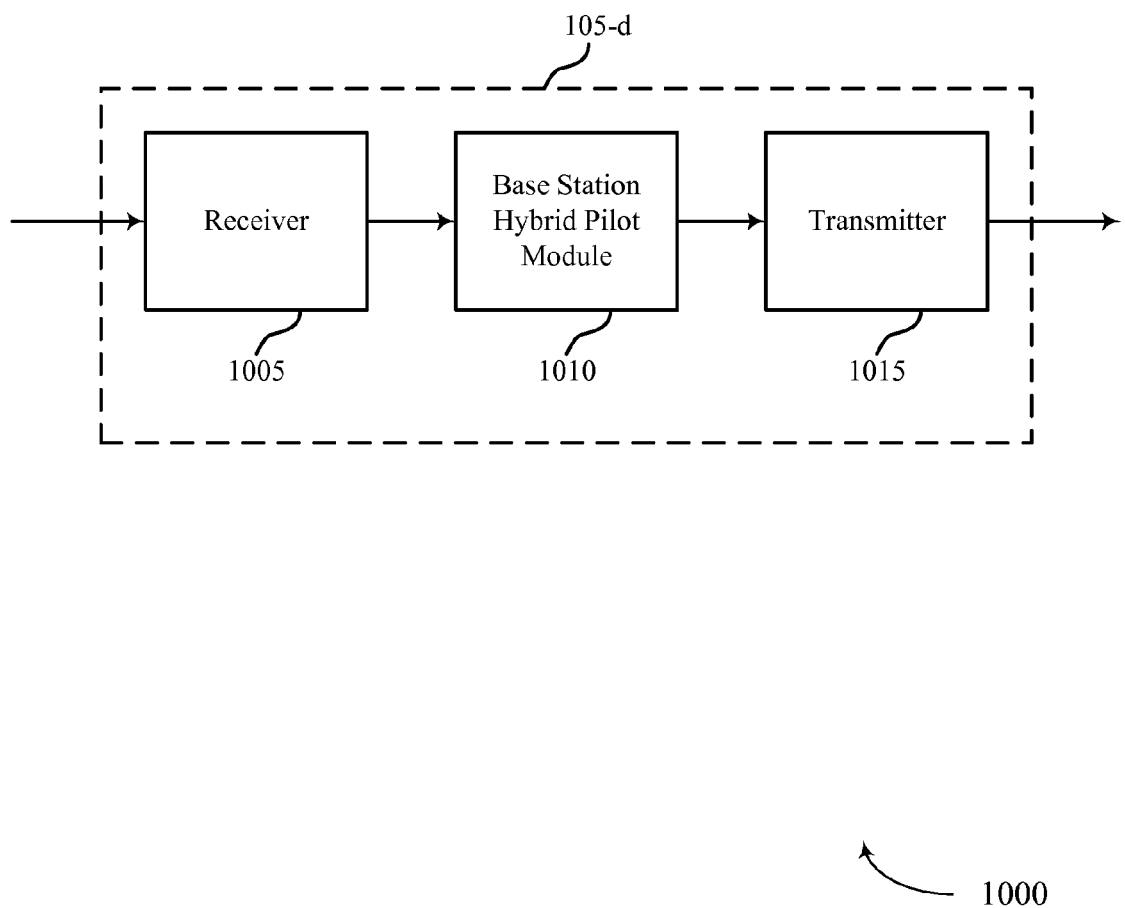
FIG. 10 shows a block diagram of a base station configured for hybrid pilot design for low latency communication in accordance with various aspects of the present disclosure.

FIG. 10 shows a block diagram 1000 of a base station 105-d configured for hybrid pilot design for low latency communication in accordance with various aspects of the present disclosure. Base station 105-d may be an example of aspects of a base station 105 described with reference to FIGS. 1-9. Base station 105-d may include a receiver 1005, a base station hybrid pilot module 1010, or a transmitter 1015. Base station 105-d may also include a processor. Each of these components may be in communication with each other.

The components of base station 105-d may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 1005 may receive information such as packets, user data, or control information associated with various information channels (e.g., control channels, data channels, and information related to hybrid pilot design for low latency communication, etc.). Information may be passed on to the base station hybrid pilot module 1010, and to other components of base station 105-d.

The base station hybrid pilot module 1010 may transmit a first set of pilot signals based at least in part on a periodic pilot transmission configuration, embed a second set of pilot signals in a low latency burst based at least in part on a burst pilot transmission configuration, wherein the burst pilot transmission configuration is different than the periodic pilot transmission configuration, and transmit the low latency burst comprising the embedded second set of pilot signals.

The transmitter 1015 may transmit signals received from other components of base station 105-d. In some embodiments, the transmitter 1015 may be collocated with the receiver 1005 in a transceiver module. The transmitter 1015 may include a single antenna, or it may include a plurality of antennas.

Figure 11:
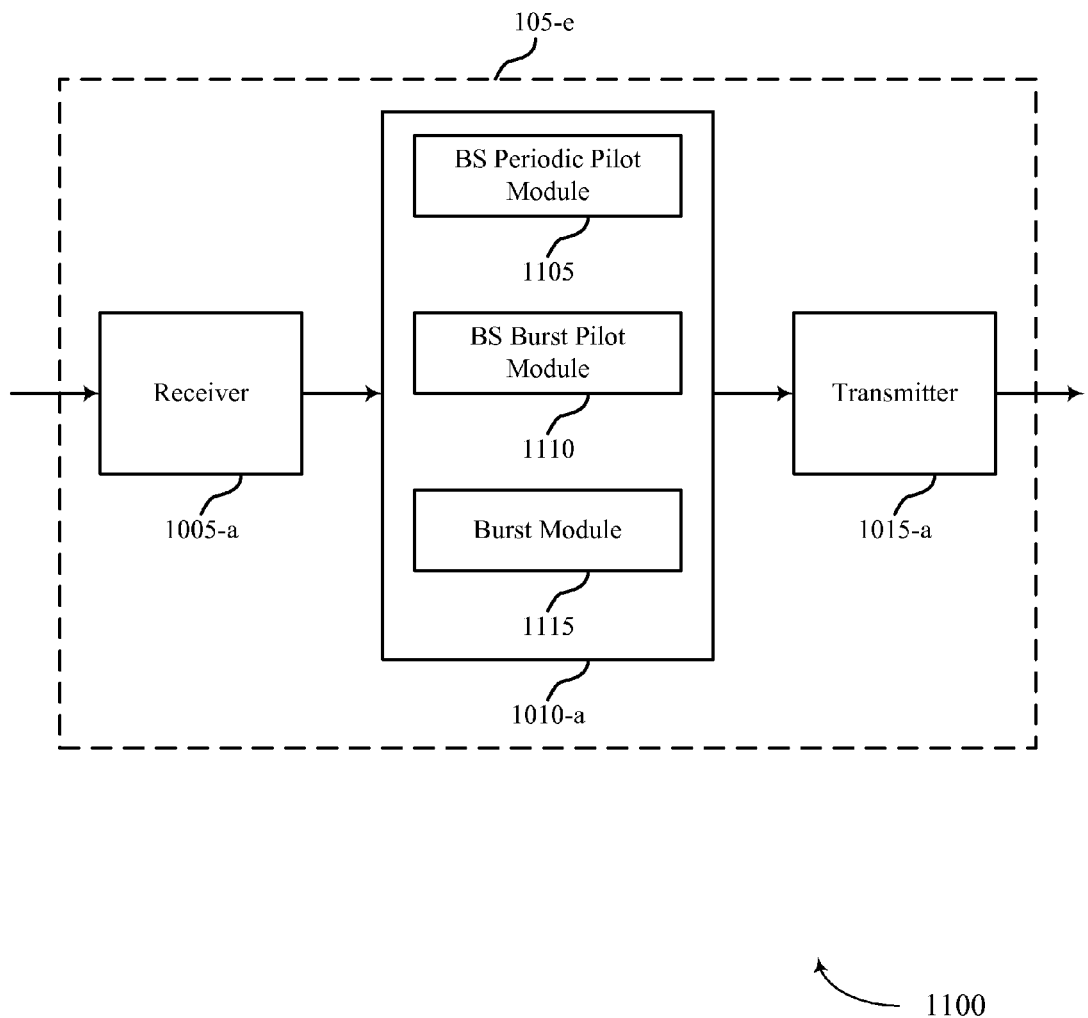
FIG. 11 shows a block diagram of a base station hybrid pilot module configured for hybrid pilot design for low latency communication in accordance with various aspects of the present disclosure.

FIG. 11 shows a block diagram 1100 of a base station 105-e for hybrid pilot design for low latency communication in accordance with various aspects of the present disclosure. Base station 105-e may be an example of aspects of a base station 105 described with reference to FIGS. 1-10. Base station 105-e may include a receiver 1005-a, a base station hybrid pilot module 1010-a, or a transmitter 1015-a. Base station 105-e may also include a processor. Each of these components may be in communication with each other. The base station hybrid pilot module 1010-a may also include a BS periodic pilot module 1105, a BS burst pilot module 1110, and a burst module 1115.

The components of base station 105-e may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 1005-a may receive information which may be passed on to base station hybrid pilot module 1010-a, and to other components of base station 105-e. The base station hybrid pilot module 1010-a may perform the operations described above with reference to FIG. 10. The transmitter 1015-a may transmit signals received from other components of base station 105-e.

The BS periodic pilot module 1105 may transmit a first set of pilot signals based at least in part on a periodic pilot transmission configuration as described above with reference to FIGS. 2-5.

The BS burst pilot module 1110 may embed a second set of pilot signals in a low latency burst based at least in part on a burst pilot transmission configuration, wherein the burst pilot transmission configuration is different than the periodic pilot transmission configuration as described above with reference to FIGS. 2-5. In some examples, the embedded second set of pilot signals are demodulation pilot signals.

The burst module 1115 may transmit the low latency burst comprising the embedded second set of pilot signals as described above with reference to FIGS. 2-5. The burst module 1115 may also transmit a subsequent low latency burst without a set of pilot signals based on a subsequent burst pilot transmission configuration. In some examples, the low latency burst comprises one or more control channel transmissions.

Figure 12:
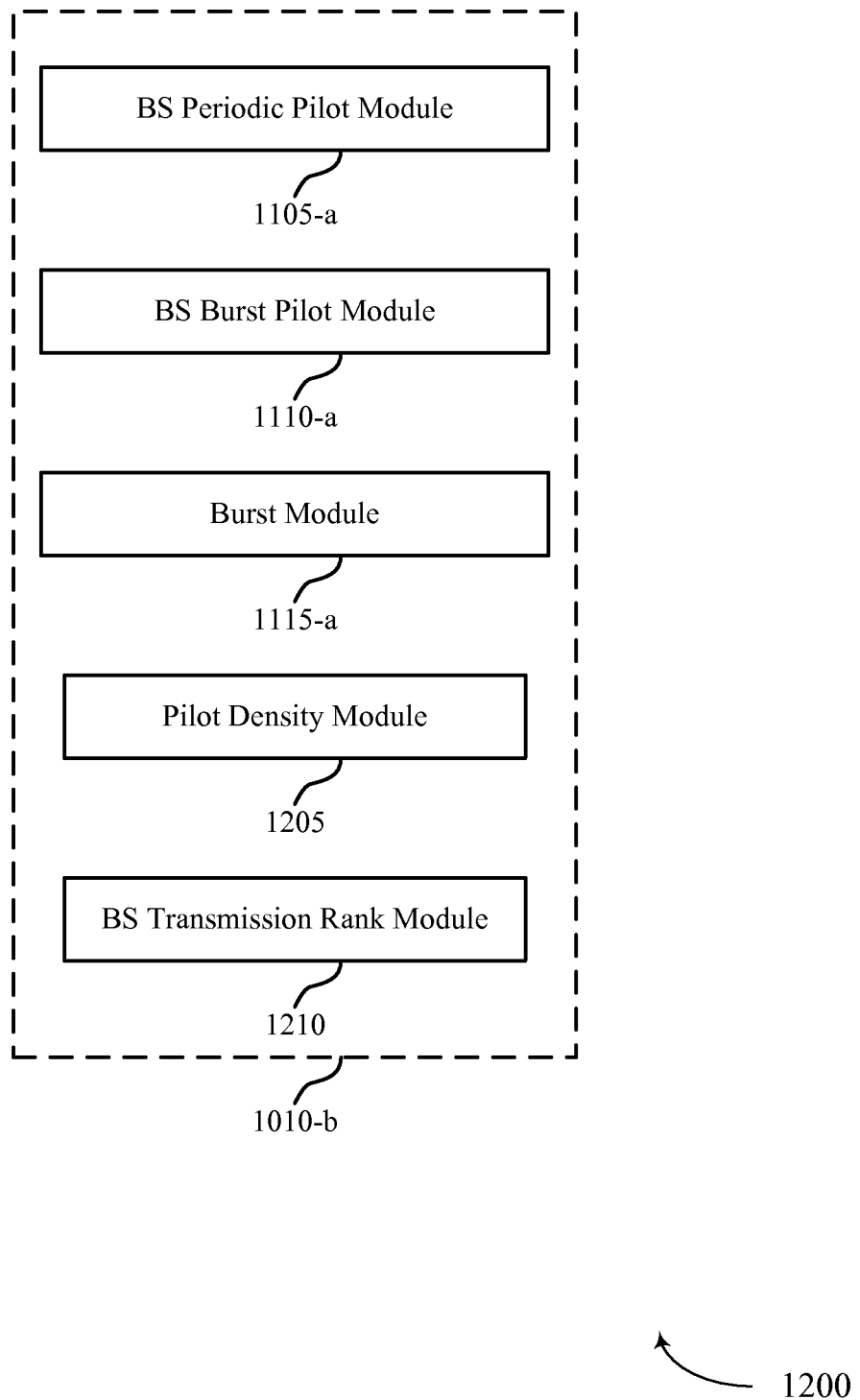
FIG. 12 shows a block diagram of a base station configured for hybrid pilot design for low latency communication in accordance with various aspects of the present disclosure.

FIG. 12 shows a block diagram 1200 of a base station hybrid pilot module 1010-b for hybrid pilot design for low latency communication in accordance with various aspects of the present disclosure. The base station hybrid pilot module 1010-b may be an example of aspects of a base station hybrid pilot module 1010 described with reference to FIGS. 10-11. The base station hybrid pilot module 1010-b may include a BS periodic pilot module 1105-a, a BS burst pilot module 1110-a, and a burst module 1115-a. Each of these modules may perform the functions described above with reference to FIG. 11. The base station hybrid pilot module 1010-b may also include a pilot density module 1205, a BS transmission rank module 1210.

The components of the base station hybrid pilot module 1010-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The pilot density module 1205 may select the burst pilot transmission configuration to comprise a higher pilot density than the periodic pilot transmission configuration as described above with reference to FIGS. 2-5.

The BS transmission rank module 1210 may select the burst pilot transmission configuration to comprise a set of pilot signals embedded in a data symbol with a tone density in a frequency domain corresponding to a channel PDP of the low latency burst for a rank one transmission scheme as described above with reference to FIGS. 2-5. The BS transmission rank module 1210 may also select the burst pilot transmission configuration to comprise a set of pilot signals embedded in a data symbol with a tone density in a frequency domain corresponding to a channel PDP of the low latency burst for a rank two transmission scheme.

Figure 13:
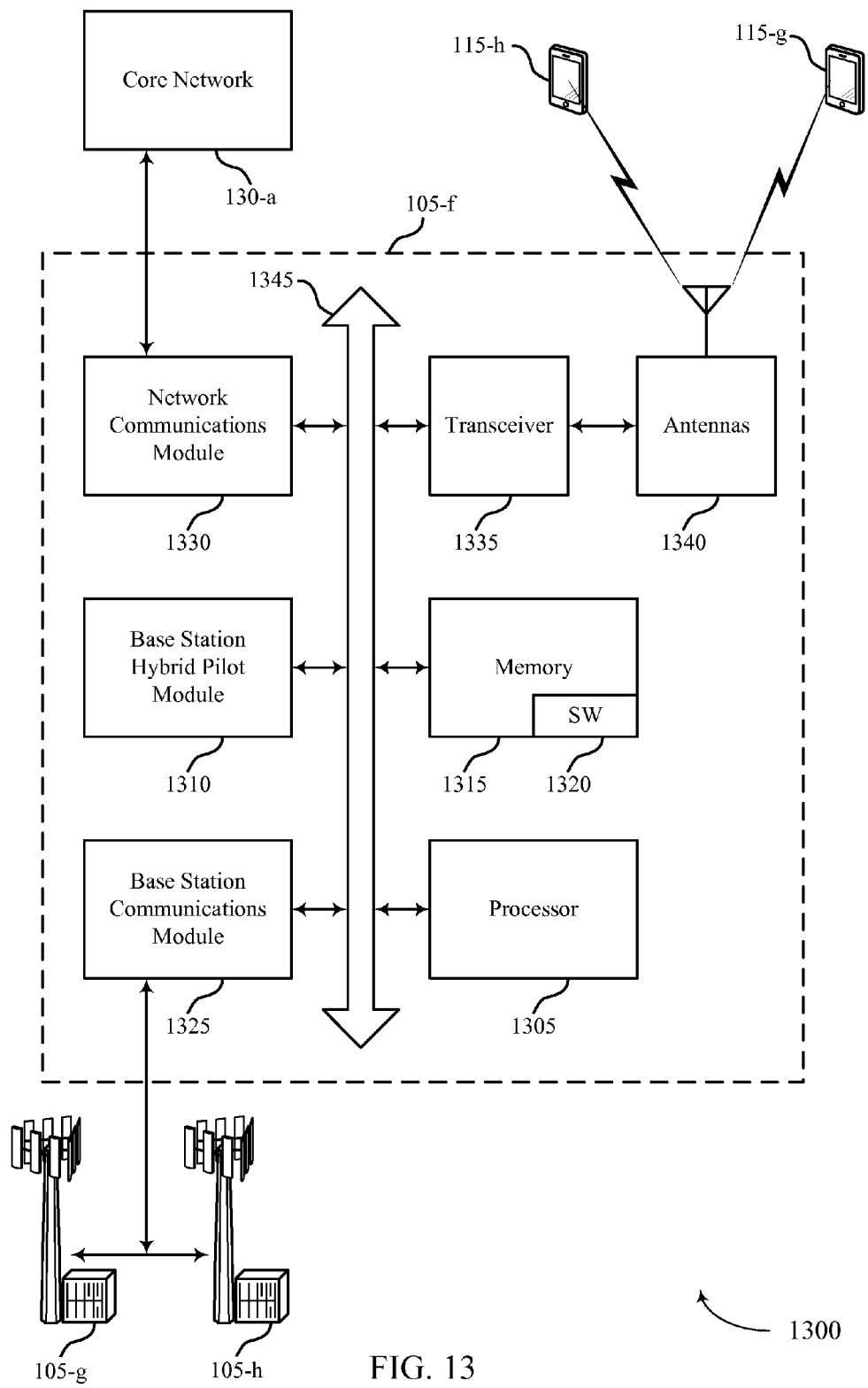
FIG. 13 illustrates a block diagram of a system including a base station configured for hybrid pilot design for low latency communication in accordance with various aspects of the present disclosure.

FIG. 13 shows a diagram of a system 1300 including a base station 105-f configured for hybrid pilot design for low latency communication in accordance with various aspects of the present disclosure. System 1300 may include base station 105-f, which may be an example of a base station 105 described above with reference to FIGS. 1-12. Base station 105-f may include a base station hybrid pilot module 1310, which may be an example of a base station hybrid pilot module 1010 described with reference to FIGS. 10-12. Base station 105-f may also include components for bi-directional voice and data communications including components for transmitting communications and components for receiving communications. For example, base station 105-f may communicate bi-directionally with base station 105-g or base station 105-h using a low latency transmission structure and a hybrid pilot configuration.

In some cases, base station 105-f may have one or more wired backhaul links. Base station 105-f may have a wired backhaul link (e.g., S1 interface, etc.) to the core network 130. Base station 105-f may also communicate with other base stations 105, such as base station 105-g and base station 105-h via inter-base station backhaul links (e.g., an X2 interface). Each of the base stations 105 may communicate with UEs 115 using the same or different wireless communications technologies. In some cases, base station 105-f may communicate with other base stations such as 105-g or 105-h utilizing base station communication module 1325. In some embodiments, base station communication module 1325 may provide an X2 interface within an LTE/LTE-A wireless communication network technology to provide communication between some of the base stations 105. In some embodiments, base station 105-f may communicate with other base stations through core network 130. In some cases, base station 105-f may communicate with the core network 130-a through network communications module 1330.

The base station 105-f may include a processor module 1305, memory 1315 (including software (SW) 1320), transceiver modules 1335, and antenna(s) 1340, which each may be in communication, directly or indirectly, with one another (e.g., over bus system 1345). The transceiver modules 1335 may be configured to communicate bi-directionally, via the antenna(s) 1340, with the UEs 115, which may be multi-mode devices. The transceiver module 1335 (or other components of the base station 105-f) may also be configured to communicate bi-directionally, via the antennas 1340, with one or more other base stations (not shown). The transceiver module 1335 may include a modem configured to modulate the packets and provide the modulated packets to the antennas 1340 for transmission, and to demodulate packets received from the antennas 1340. The base station 105-f may include multiple transceiver modules 1335, each with one or more associated antennas 1340. The transceiver module may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor module 1310 to perform various functions described herein (e.g., hybrid pilot design for low latency communication, selecting coverage enhancement techniques, call processing, database management, message routing, etc.). Alternatively, the software 1320 may not be directly executable by the processor module 1305 but be configured to cause the computer, e.g., when compiled and executed, to perform functions described herein. The processor module 1305 may include an intelligent hardware device, (e.g., a CPU, a microcontroller, an ASIC, etc). The processor module 1305 may include various special purpose processors such as encoders, queue processing modules, base band processors, radio head controllers, digital signal processor (DSPs), and the like.

The base station communications module 1325 may manage communications with other base stations 105. The communications management module may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

Figure 14:
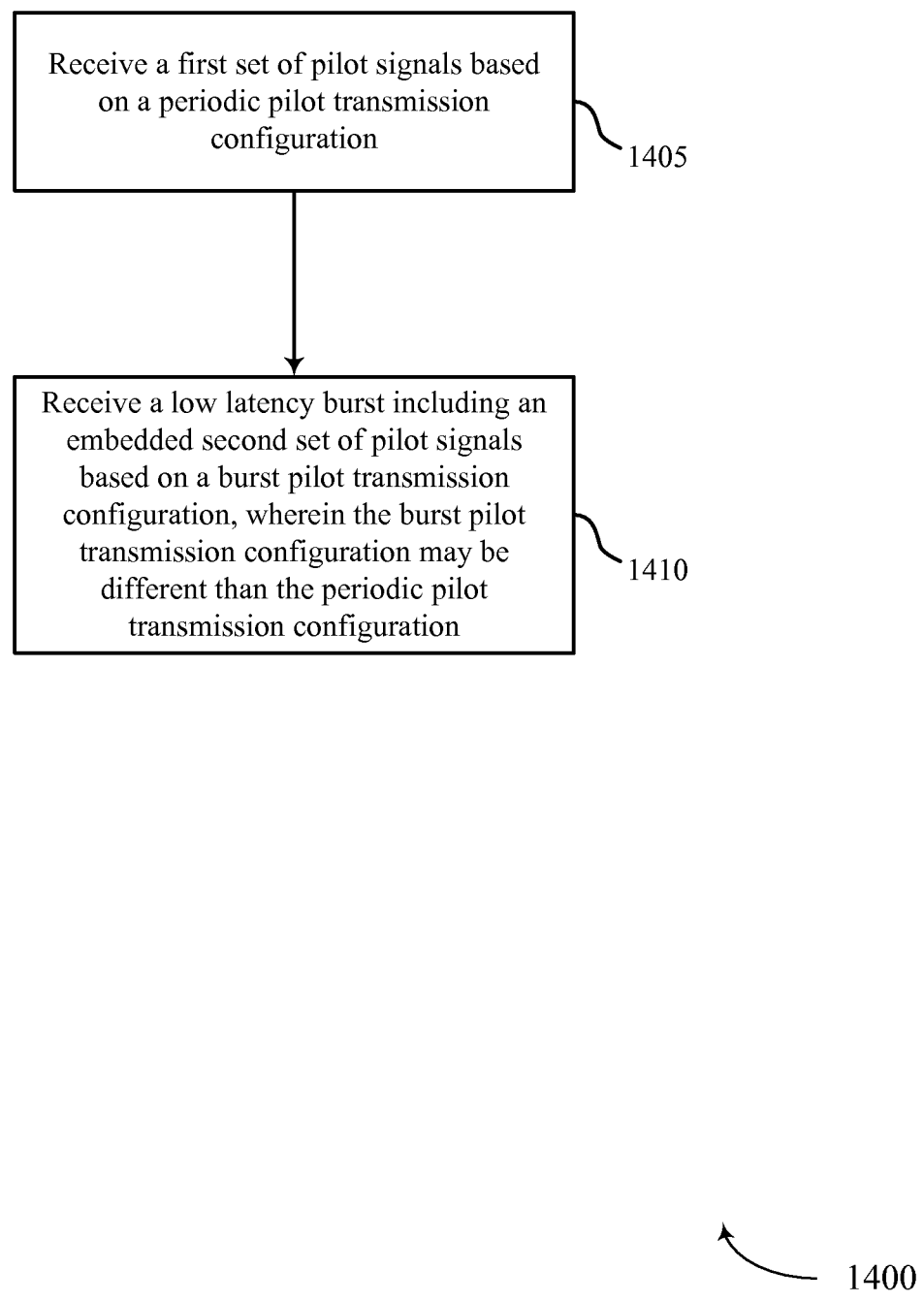
FIG. 14 shows a flowchart illustrating a method for hybrid pilot design for low latency communication in accordance with various aspects of the present disclosure.

FIG. 14 shows a flowchart illustrating a method 1400 for hybrid pilot design for low latency communication in accordance with various aspects of the present disclosure. The operations of method 1400 may be implemented by a UE 115 or its components as described with reference to FIGS. 1-13. For example, the operations of method 1400 may be performed by the hybrid pilot module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may receive a first set of pilot signals based at least in part on a periodic pilot transmission configuration as described above with reference to FIGS. 2-5. In certain examples, the operations of block 1405 may be performed by the periodic pilot module 705 as described above with reference to FIG. 7.

At block 1410, the UE 115 may receive a low latency burst comprising an embedded second set of pilot signals based at least in part on a burst pilot transmission configuration, wherein the burst pilot transmission configuration is different than the periodic pilot transmission configuration as described above with reference to FIGS. 2-5. In certain examples, the operations of block 1410 may be performed by the burst pilot module 710 as described above with reference to FIG. 7.

Figure 15:
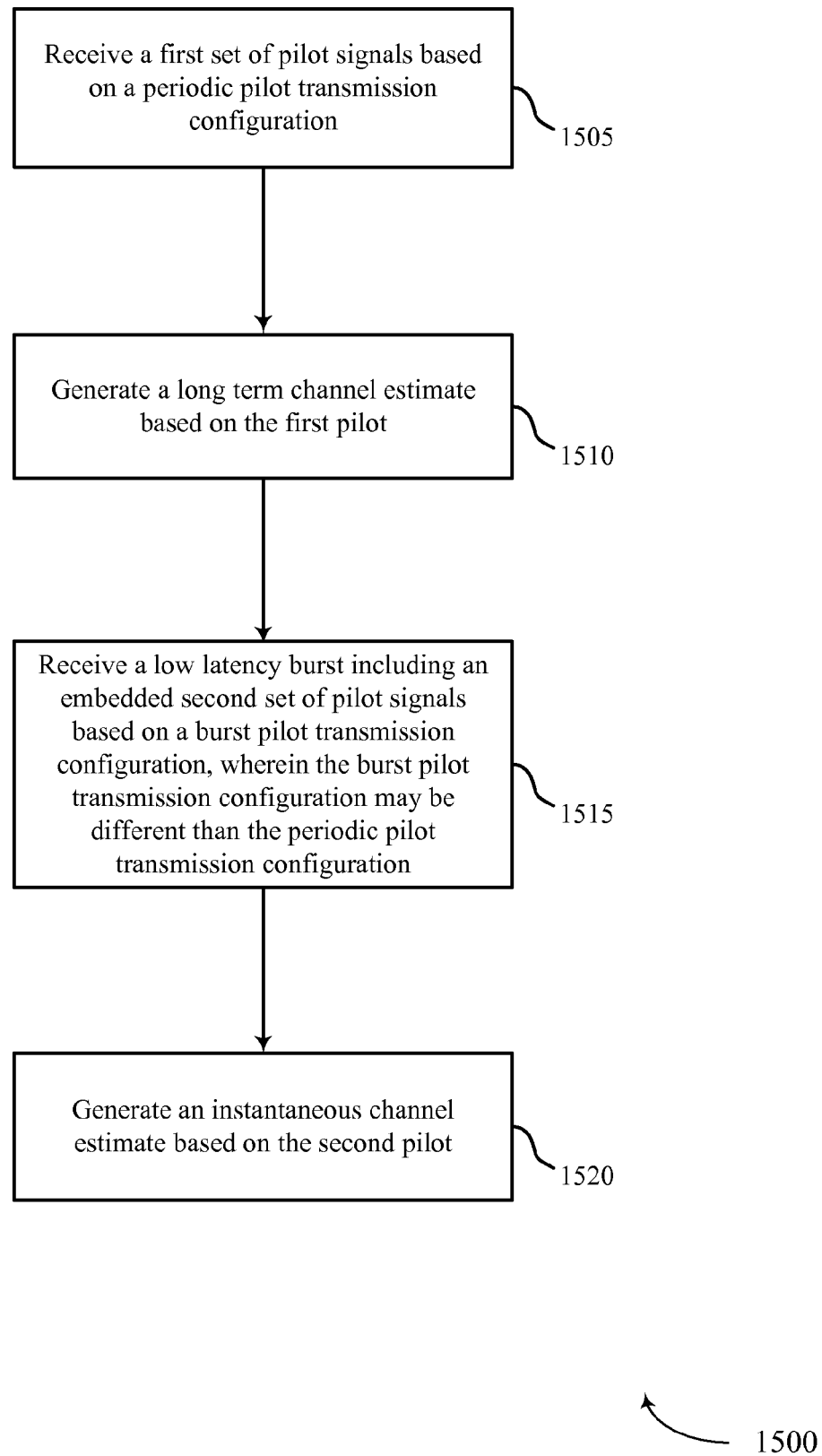
FIG. 15 shows a flowchart illustrating a method for hybrid pilot design for low latency communication in accordance with various aspects of the present disclosure.

FIG. 15 shows a flowchart illustrating a method 1500 for hybrid pilot design for low latency communication in accordance with various aspects of the present disclosure. The operations of method 1500 may be implemented by a UE 115 or its components as described with reference to FIGS. 1-13. For example, the operations of method 1500 may be performed by the hybrid pilot module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of method 1400 of FIG. 14.

At block 1505, the UE 115 may receive a first set of pilot signals based at least in part on a periodic pilot transmission configuration as described above with reference to FIGS. 2-5. In certain examples, the operations of block 1505 may be performed by the periodic pilot module 705 as described above with reference to FIG. 7.

At block 1510, the UE 115 may generate a long term channel estimate based at least in part on the first set of pilot signals as described above with reference to FIGS. 2-5. In certain examples, the operations of block 1510 may be performed by the long term channel estimate module 805 as described above with reference to FIG. 8.

At block 1515, the UE 115 may receive a low latency burst comprising an embedded second set of pilot signals based at least in part on a burst pilot transmission configuration, wherein the burst pilot transmission configuration is different than the periodic pilot transmission configuration as described above with reference to FIGS. 2-5. In certain examples, the operations of block 1515 may be performed by the burst pilot module 710 as described above with reference to FIG. 7.

At block 1520, the UE 115 may generate an instantaneous channel estimate based at least in part on the second set of pilot signals as described above with reference to FIGS. 2-5. In certain examples, the operations of block 1520 may be performed by the instantaneous channel estimate module 810 as described above with reference to FIG. 8.

Figure 16:
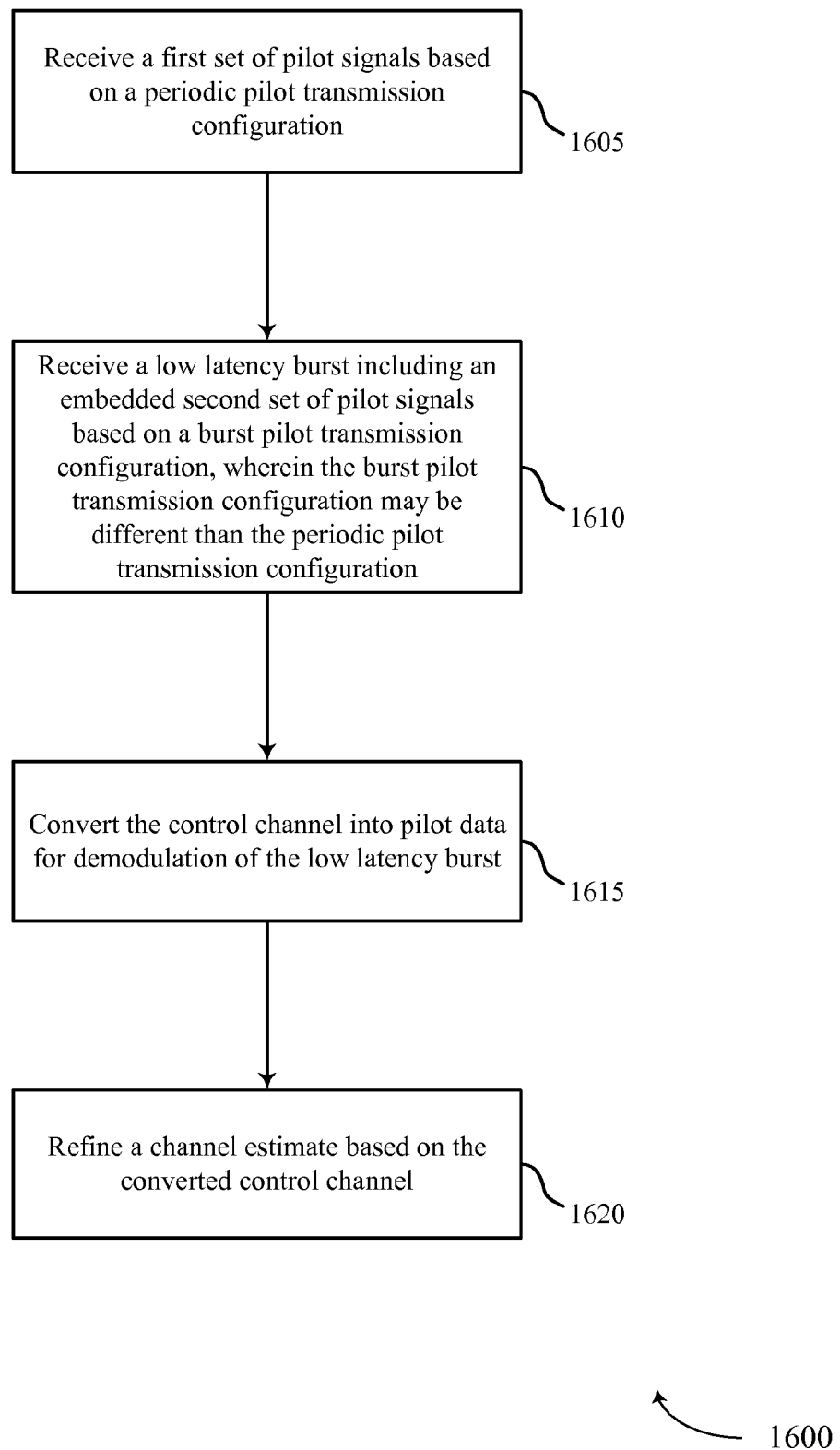
FIG. 16 shows a flowchart illustrating a method for hybrid pilot design for low latency communication in accordance with various aspects of the present disclosure.

FIG. 16 shows a flowchart illustrating a method 1600 for hybrid pilot design for low latency communication in accordance with various aspects of the present disclosure. The operations of method 1600 may be implemented by a UE 115 or its components as described with reference to FIGS. 1-13. For example, the operations of method 1600 may be performed by the hybrid pilot module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1400, and 1500 of FIGS. 14-15.

At block 1605, the UE 115 may receive a first set of pilot signals based at least in part on a periodic pilot transmission configuration as described above with reference to FIGS. 2-5. In certain examples, the operations of block 1605 may be performed by the periodic pilot module 705 as described above with reference to FIG. 7.

At block 1610, the UE 115 may receive a low latency burst comprising an embedded second set of pilot signals based at least in part on a burst pilot transmission configuration, wherein the burst pilot transmission configuration is different than the periodic pilot transmission configuration as described above with reference to FIGS. 2-5. In certain examples, the operations of block 1610 may be performed by the burst pilot module 710 as described above with reference to FIG. 7.

At block 1615, the UE 115 may convert the one or more control channel transmissions into pilot data for demodulation of the low latency burst as described above with reference to FIGS. 2-5. In certain examples, the operations of block 1615 may be performed by the control channel conversion module 820 as described above with reference to FIG. 8.

At block 1620, the UE 115 may refine a channel estimate based on the converted control channel as described above with reference to FIGS. 2-5. In certain examples, the operations of block 1620 may be performed by the instantaneous channel estimate module 810 as described above with reference to FIG. 8.

Figure 17:
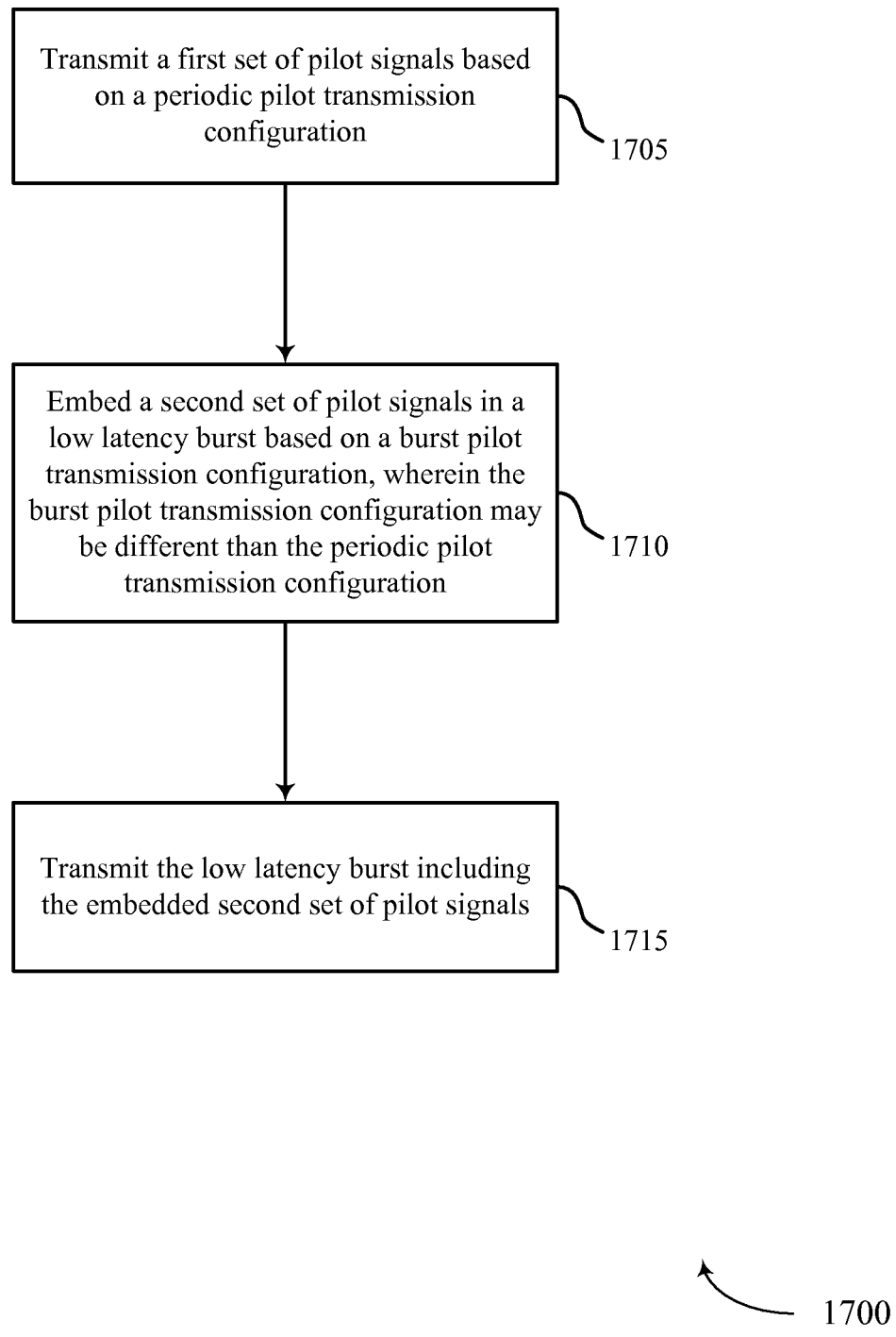
FIG. 17 shows a flowchart illustrating a method for hybrid pilot design for low latency communication in accordance with various aspects of the present disclosure.

FIG. 17 shows a flowchart illustrating a method 1700 for hybrid pilot design for low latency communication in accordance with various aspects of the present disclosure. The operations of method 1700 may be implemented by a base station 105 or its components as described with reference to FIGS. 1-13. For example, the operations of method 1700 may be performed by the base station hybrid pilot module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1400, 1500, and 1600 of FIGS. 14-16.

At block 1705, the base station 105 may transmit a first set of pilot signals based at least in part on a periodic pilot transmission configuration as described above with reference to FIGS. 2-5. In certain examples, the operations of block 1705 may be performed by the BS periodic pilot module 1105 as described above with reference to FIG. 1.

At block 1710, the base station 105 may embed a second set of pilot signals in a low latency burst based at least in part on a burst pilot transmission configuration, wherein the burst pilot transmission configuration is different than the periodic pilot transmission configuration as described above with reference to FIGS. 2-5. In certain examples, the operations of block 1710 may be performed by the BS burst pilot module 1110 as described above with reference to FIG. 1.

At block 1715, the base station 105 may transmit the low latency burst comprising the embedded second set of pilot signals as described above with reference to FIGS. 2-5. In certain examples, the operations of block 1715 may be performed by the burst module 1115 as described above with reference to FIG. 1.

Figure 18:
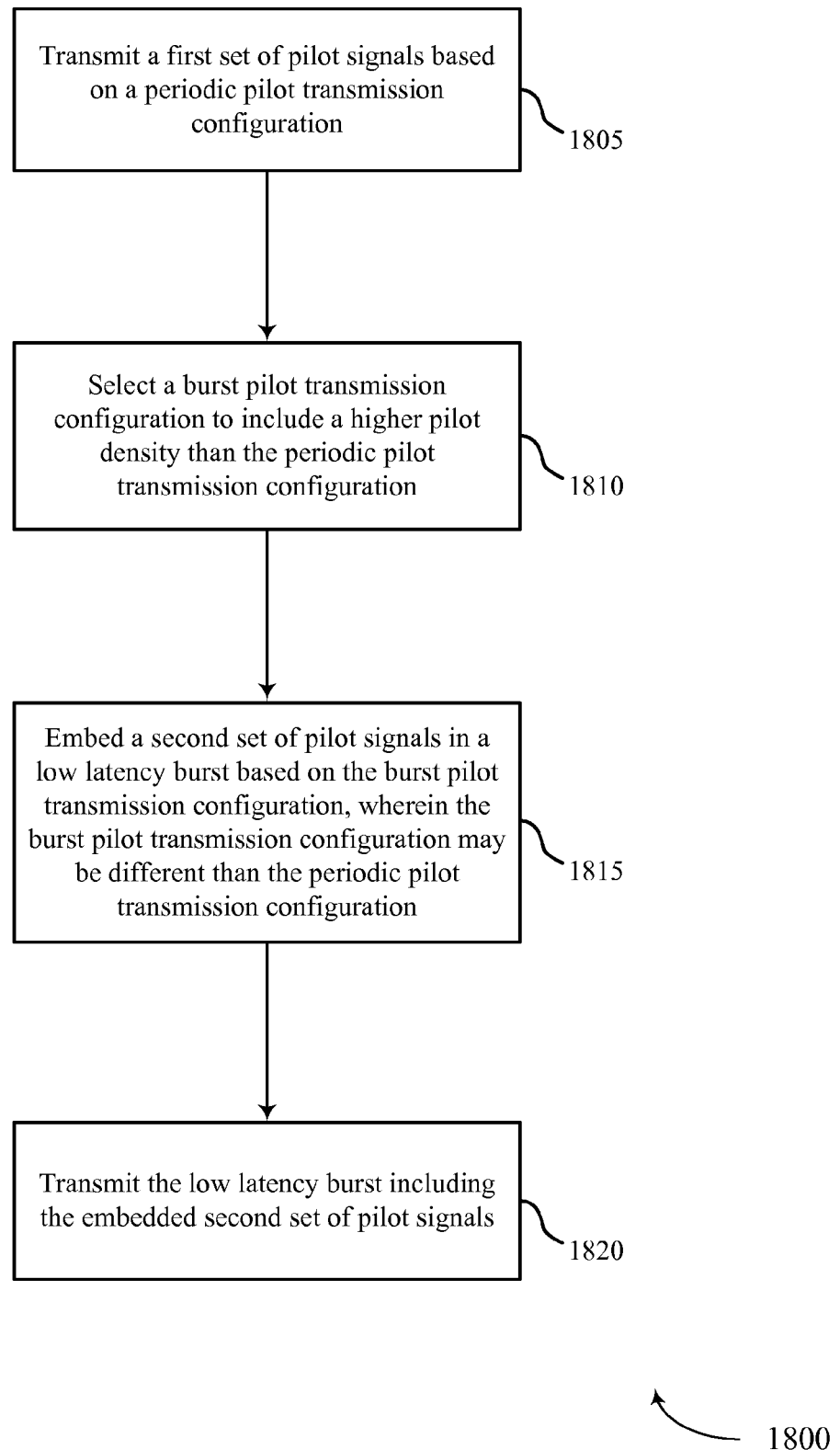
FIG. 18 shows a flowchart illustrating a method for hybrid pilot design for low latency communication in accordance with various aspects of the present disclosure.

FIG. 18 shows a flowchart illustrating a method 1800 for hybrid pilot design for low latency communication in accordance with various aspects of the present disclosure. The operations of method 1800 may be implemented by a base station 105 or its components as described with reference to FIGS. 1-13. For example, the operations of method 1800 may be performed by the base station hybrid pilot module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of methods 1400, 1500, 1600, and 1700 of FIGS. 14-17.

At block 1805, the base station 105 may transmit a first set of pilot signals based at least in part on a periodic pilot transmission configuration as described above with reference to FIGS. 2-5. In certain examples, the operations of block 1805 may be performed by the BS periodic pilot module 1105 as described above with reference to FIG. 1.

At block 1810, the base station 105 may select the burst pilot transmission configuration to comprise a higher pilot density than the periodic pilot transmission configuration as described above with reference to FIGS. 2-5. In certain examples, the operations of block 1810 may be performed by the pilot density module 1205 as described above with reference to FIG. 1.

At block 1815, the base station 105 may embed a second set of pilot signals in a low latency burst based at least in part on a burst pilot transmission configuration, wherein the burst pilot transmission configuration is different than the periodic pilot transmission configuration as described above with reference to FIGS. 2-5. In certain examples, the operations of block 1815 may be performed by the BS burst pilot module 1110 as described above with reference to FIG. 1.

At block 1820, the base station 105 may transmit the low latency burst comprising the embedded second set of pilot signals as described above with reference to FIGS. 2-5. In certain examples, the operations of block 1820 may be performed by the burst module 1115 as described above with reference to FIG. 1.

Figure 19:
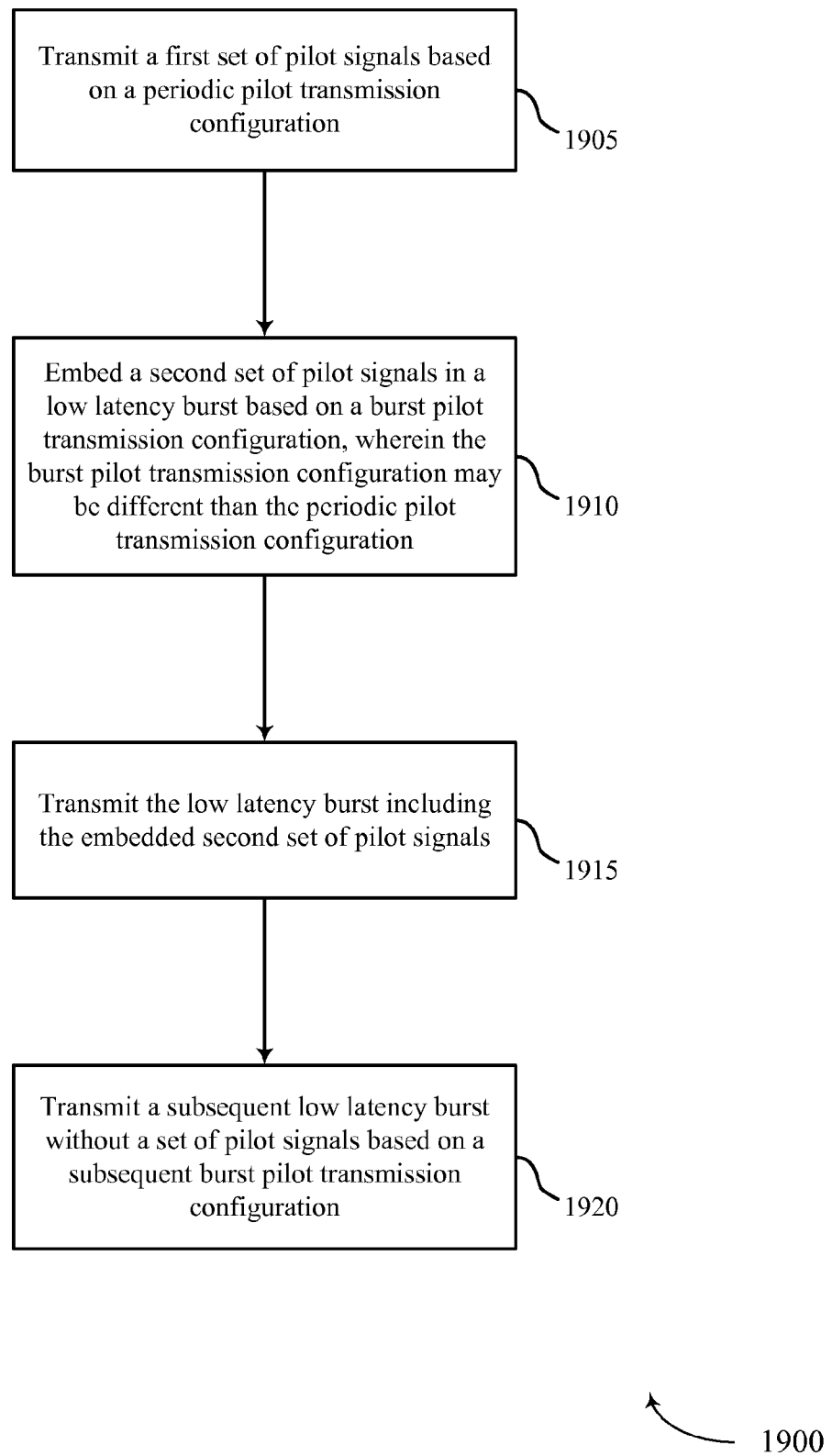
FIG. 19 shows a flowchart illustrating a method for hybrid pilot design for low latency communication in accordance with various aspects of the present disclosure.

FIG. 19 shows a flowchart illustrating a method 1900 for hybrid pilot design for low latency communication in accordance with various aspects of the present disclosure. The operations of method 1900 may be implemented by a base station 105 or its components as described with reference to FIGS. 1-13. For example, the operations of method 1900 may be performed by the base station hybrid pilot module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1900 may also incorporate aspects of methods 1400, 1500, 1600, 1700, and 1800 of FIGS. 14-18.

At block 1905, the base station 105 may transmit a first set of pilot signals based at least in part on a periodic pilot transmission configuration as described above with reference to FIGS. 2-5. In certain examples, the operations of block 1905 may be performed by the BS periodic pilot module 1105 as described above with reference to FIG. 1.

At block 1910, the base station 105 may embed a second set of pilot signals in a low latency burst based at least in part on a burst pilot transmission configuration, wherein the burst pilot transmission configuration is different than the periodic pilot transmission configuration as described above with reference to FIGS. 2-5. In certain examples, the operations of block 1910 may be performed by the BS burst pilot module 1110 as described above with reference to FIG. 1.

At block 1915, the base station 105 may transmit the low latency burst comprising the embedded second set of pilot signals as described above with reference to FIGS. 2-5. In certain examples, the operations of block 1915 may be performed by the burst module 1115 as described above with reference to FIG. 1.

At block 1920, the base station 105 may transmit a subsequent low latency burst without a set of pilot signals based on a subsequent burst pilot transmission configuration as described above with reference to FIGS. 2-5. In certain examples, the operations of block 1920 may be performed by the burst module 1115 as described above with reference to FIG. 1.

Thus, methods 1400, 1500, 1600, 1700, 1800, and 1900 may provide for hybrid pilot design for low latency communication. It should be noted that methods 1400, 1500, 1600, 1700, 1800, and 1900 describe possible implementation, and that the operations and the steps may be rearranged or otherwise modified such that other implementations are possible. In some examples, aspects from two or more of the methods 1400, 1500, 1600, 1700, 1800, and 1900 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   receiving a first set of pilot signals based at least in part on a periodic pilot transmission configuration;
   receiving a low latency burst comprising an embedded second set of pilot signals based at least in part on a burst pilot transmission configuration and comprising one or more control channel transmissions, wherein the burst pilot transmission configuration is different than the periodic pilot transmission configuration; and
   converting the one or more control channel transmissions into pilot data for demodulation of the low latency burst.

2. The method of claim 1, further comprising:
   generating a long term channel estimate based at least in part on the first set of pilot signals.

3. The method of claim 2, further comprising:
   generating an instantaneous channel estimate based at least in part on the second set of pilot signals.

4. The method of claim 3, further comprising:
   demodulating the low latency burst utilizing the long term channel estimate and the instantaneous channel estimate.

5. The method of claim 2, further comprising:
   transmitting a channel state information message to a base station based on the long term channel estimate.

6. The method of claim 2, further comprising:
updating a tracking loop based at least in part on the long term channel estimate.

7. The method of claim 1, further comprising:
refining a channel estimate based on the converted control channel.

8. The method of claim 1, further comprising:
receiving a subsequent low latency burst without pilots based on a subsequent burst transmission configuration.

9. The method of claim 1, wherein the burst pilot transmission configuration comprises a set of pilot signals embedded based on a rank one transmission.

10. The method of claim 1, wherein the burst pilot transmission configuration comprises a set of pilot signals embedded based on a rank two transmission.

11. The method of claim 1, wherein the burst pilot transmission configuration comprises a higher pilot density than the periodic pilot transmission configuration.

12. The method of claim 1, wherein the embedded second set of pilot signals are demodulation pilot signals.

13. A method of wireless communication at a base station, comprising:
transmitting a first set of pilot signals based at least in part on a periodic pilot transmission configuration;
embedding a second set of pilot signals in a low latency burst based at least in part on a burst pilot transmission configuration, wherein the burst pilot transmission configuration is different than the periodic pilot transmission configuration, wherein the low latency burst comprises one or more control channel transmissions;
transmitting the low latency burst comprising the embedded second set of pilot signals; and
transmitting a subsequent low latency burst without a set of pilot signals based on a subsequent burst pilot transmission configuration.

14. The method of claim 13, further comprising:
selecting the burst pilot transmission configuration to comprise a higher pilot density than the periodic pilot transmission configuration.

15. The method of claim 13, further comprising:
selecting the burst pilot transmission configuration to comprise a set of pilot signals embedded in a data symbol with a tone density in a frequency domain corresponding to a channel power delay profile (PDP) of the low latency burst for a rank one transmission scheme.

16. The method of claim 13, further comprising:
selecting the burst pilot transmission configuration to comprise a set of pilot signals embedded in a data symbol with a tone density in a frequency domain corresponding to a channel power delay profile (PDP) of the low latency burst for a rank two transmission scheme.

17. The method of claim 13, wherein the embedded second set of pilot signals are demodulation pilot signals.

18. An apparatus for wireless communication at a user equipment (UE), comprising:
a processor;
memory in electronic communication with the processor; and
instructions stored in the memory; wherein the instructions are executable by the processor to:
receive a first set of pilot signals based at least in part on a periodic pilot transmission configuration;
receive a low latency burst comprising an embedded second set of pilot signals based at least in part on a burst pilot transmission configuration and comprising one or more control channel transmissions, wherein the burst pilot transmission configuration is different than the periodic pilot transmission configuration; and
convert the one or more control channel transmissions into pilot data for demodulation of the low latency burst.

19. The apparatus of claim 18, wherein the instructions are executable by the processor to:
generate a long term channel estimate based at least in part on the first set of pilot signals.

20. The apparatus of claim 19, wherein the instructions are executable by the processor to:
generate an instantaneous channel estimate based at least in part on the second set of pilot signals.

21. The apparatus of claim 19, wherein the instructions are executable by the processor to:
transmit a channel state information message to a base station based on the long term channel estimate.

22. The apparatus of claim 18, wherein the instructions are executable by the processor to:
receive a subsequent low latency burst without pilots based on a subsequent burst transmission configuration.

23. An apparatus for wireless communication at a base station, comprising:
a processor;
memory in electronic communication with the processor; and
instructions stored in the memory; wherein the instructions are executable by the processor to:
transmit a first set of pilot signals based at least in part on a periodic pilot transmission configuration;
embed a second set of pilot signals in a low latency burst based at least in part on a burst pilot transmission configuration, wherein the burst pilot transmission configuration is different than the periodic pilot transmission configuration, wherein the low latency burst comprises one or more control channel transmissions;
transmit the low latency burst comprising the embedded second set of pilot signals; and
transmit a subsequent low latency burst without a set of pilot signals based on a subsequent burst pilot transmission configuration.

24. The apparatus of claim 23, wherein the instructions are executable by the processor to:
select the burst pilot transmission configuration to comprise a higher pilot density than the periodic pilot transmission configuration.

25. The apparatus of claim 23, wherein the instructions are executable by the processor to:
select the burst pilot transmission configuration to comprise a set of pilot signals embedded in a data symbol with a tone density in a frequency domain corresponding to a channel power delay profile (PDP) of the low latency burst for a rank one transmission scheme.

26. The apparatus of claim 23, wherein the instructions are executable by the processor to:
select the burst pilot transmission configuration to comprise a set of pilot signals embedded in a data symbol with a tone density in a frequency domain corresponding to a channel power delay profile (PDP) of the low latency burst for a rank two transmission scheme.

* * * * *